(12) United States Patent
Li et al.

(10) Patent No.: US 11,766,753 B2
(45) Date of Patent: Sep. 26, 2023

(54) MILLING SYSTEM AND METHOD UNDER DIFFERENT LUBRICATION CONDITIONS

(71) Applicants: QINGDAO UNIVERSITY OF TECHNOLOGY, Qingdao (CN); CHONGQING UNIVERSITY, Chongqing (CN); SHANGHAI JINZHAO ENERGY SAVING TECHNOLOGY CO., LTD, Shanghai (CN)

(72) Inventors: Changhe Li, Qingdao (CN); Qingan Yin, Qingdao (CN); Yanbin Zhang, Qingdao (CN); Huajun Cao, Qingdao (CN); Zhenjing Duan, Qingdao (CN); Cong Mao, Qingdao (CN); Wenfeng Ding, Qingdao (CN); Naiqing Zhang, Qingdao (CN); Lan Dong, Qingdao (CN); Xiufang Bai, Qingdao (CN); Menghua Sui, Qingdao (CN); Yonghong Liu, Qingdao (CN); Wentao Wu, Qingdao (CN); Teng Gao, Qingdao (CN); Min Yang, Qingdao (CN); Dongzhou Jia, Qingdao (CN); Runze Li, Qingdao (CN); Yali Hou, Qingdao (CN)

(73) Assignees: QINGDAO UNIVERSITY OF TECHNOLOGY, Qingdao (CN); CHONGQING UNIVERSITY, Chongqing (CN); SHANGHAI JINZHAO ENERGY SAVING TECHNOLOGY CO., LTD, Shanghai (CN)

( * ) Notice: Subject to any disclaimer, the term of this patent is extended or adjusted under 35 U.S.C. 154(b) by 114 days.

(21) Appl. No.: 17/468,668

(22) Filed: Sep. 7, 2021

(65) Prior Publication Data
US 2021/0402540 A1 Dec. 30, 2021

Related U.S. Application Data

(62) Division of application No. 16/683,550, filed on Nov. 14, 2019, now Pat. No. 11,161,210.

(30) Foreign Application Priority Data

Nov. 22, 2018 (CN) .......................... 201811399670.X

(51) Int. Cl.
*B23Q 3/157* (2006.01)
*B23Q 11/10* (2006.01)
(Continued)

(52) U.S. Cl.
CPC ............ *B23Q 3/15503* (2016.11); *B23C 1/06* (2013.01); *B23Q 3/15713* (2013.01);
(Continued)

(58) Field of Classification Search
CPC ........ B23Q 11/10–148; B23Q 3/15503; B23Q 3/15713; B23Q 3/1572; B23Q 3/15722;
(Continued)

(56) References Cited

U.S. PATENT DOCUMENTS 3,300,856 A * 1/1967 Daugherty ......... B23Q 3/15773
483/63
3,577,808 A * 5/1971 Visser ................ B23Q 11/1053
261/78.2

(Continued)

FOREIGN PATENT DOCUMENTS

CN 204148606 U 2/2015
DE 202014002031 U1 4/2014
(Continued)

*Primary Examiner* — Erica E Cadugan
*Assistant Examiner* — Michael Vitale
(74) *Attorney, Agent, or Firm* — True Shepherd LLC; Andrew C. Cheng

(57) ABSTRACT

The disclosure provides a milling system and method under different lubrication conditions. The system uses a tool to mill the workpiece, a force measuring system to measure the milling force, a tool change system to replace the tools, a tool storage to store the tools. It can store the tools, provide the lubricating oil to the milling surface, select different (Continued)

tools according to different processing conditions, select the best angle differences of the unequal spiral angle tools according to different conditions comprising dry cutting, casting-type lubrication, minimal quantities of lubrication or minimal quantities of nanofluid lubrication, and/or choose the optimal tool according to different cutting parameters in order to obtain the minimum milling force.

6 Claims, 12 Drawing Sheets

(51) Int. Cl.
  *B23C 1/06* (2006.01)
  *B23Q 3/155* (2006.01)
  *B23Q 15/12* (2006.01)
  *B23Q 17/09* (2006.01)
(52) U.S. Cl.
  CPC ...... *B23Q 3/15722* (2016.11); *B23Q 11/1046* (2013.01); *B23Q 15/12* (2013.01); *B23Q 17/0957* (2013.01); *B23Q 17/0966* (2013.01); *Y10T 409/304032* (2015.01); *Y10T 483/10* (2015.01); *Y10T 483/1755* (2015.01)
(58) Field of Classification Search
  CPC ....... B23Q 2003/155414; B23Q 2003/155425; B23Q 2003/155428; B23Q 2003/155435; B23Q 2003/155439; Y10T 483/10; Y10T 483/1748; Y10T 483/1752; Y10T 483/1755; Y10T 483/1767; Y10T 483/1769; Y10T 483/1771; Y10T 409/303976; Y10T 409/304032; Y10T 408/46; B23C 1/06; B23C 2210/0492
  USPC ........ 483/1, 36, 38, 39, 44, 45, 46; 409/135, 409/136; 408/61
  See application file for complete search history.

(56) References Cited

U.S. PATENT DOCUMENTS

| | | | |
|---|---|---|---|
| 4,050,146 A | 9/1977 | Geiger | |
| 5,444,634 A | 8/1995 | Goldman et al. | |
| 5,478,176 A | 12/1995 | Stedt et al. | |
| 5,615,984 A * | 4/1997 | Oberbreckling ... | B23Q 11/1084 409/137 |
| 6,305,183 B1 | 10/2001 | Mukai et al. | |
| 6,772,042 B1 | 8/2004 | Warren et al. | |
| 9,364,904 B2 | 6/2016 | Osawa et al. | |
| 11,161,210 B2 * | 11/2021 | Li ...................... | B23Q 3/15713 |
| 2002/0146297 A1 * | 10/2002 | Curtis ................ | B23Q 11/1084 408/61 |
| 2006/0188346 A1 | 8/2006 | Greenwood et al. | |
| 2007/0016325 A1 | 1/2007 | Esterling | |
| 2007/0289815 A1 | 12/2007 | Frowiss et al. | |
| 2011/0217132 A1 | 9/2011 | Wells et al. | |
| 2012/0308323 A1 * | 12/2012 | Gardner ............. | B23Q 11/1076 409/117 |
| 2017/0333053 A1 * | 11/2017 | Li .......................... | A61B 17/16 |
| 2020/0164476 A1 | 5/2020 | Li et al. | |
| 2020/0230767 A1 * | 7/2020 | Zhao .................. | B23Q 11/1076 |
| 2020/0368867 A1 * | 11/2020 | Li ...................... | B23Q 11/1076 |
| 2020/0376565 A1 * | 12/2020 | Li ........................... | B23B 27/10 |

FOREIGN PATENT DOCUMENTS

| | | | | |
|---|---|---|---|---|
| FR | 2483291 A1 | 12/1981 | | |
| JP | 07276184 A | * 10/1995 | | |
| JP | 08252745 A | 10/1996 | | |
| JP | 2000052185 A | * 2/2000 | ........ | B23Q 11/0057 |
| WO | 2017049763 A1 | 3/2017 | | |

* cited by examiner

MILLING SYSTEM AND METHOD UNDER DIFFERENT LUBRICATION CONDITIONS

CROSS-REFERENCE TO RELATED APPLICATIONS

This application is a division of U.S. patent application Ser. No. 16/683,550 with a filing date of Nov. 14, 2019, now pending. The content of the aforementioned applications, including any intervening amendments thereto, are incorporated herein by reference.

TECHNICAL FIELD

The disclosure relates to a milling system and method under different lubrication conditions.

BACKGROUND OF THE PRESENT INVENTION

At present, milling is the most commonly used machining technology in the mechanical manufacturing industry, because it has high efficiency, wide range and high precision. But the tool will be abraded sharply and disabled quickly since the very short contact time between the tool and the workpiece can make a violent friction between the front surface of the tool and the chip, and the back surface of the tool and the workpiece to produce a lot of cutting heat, which will seriously restrict the improvement of processing efficiency.

Milling force is an important parameter in milling process, which is directly related to the vibration of the system, the quality of the workpiece surface and the abrasion of the tooth. In the process of metal cutting, the cutting vibration between the tool and the workpiece, the cutting force in the machining process and the dynamic characteristics of the cutting system, are intrinsically related. In traditional machining, the choice of tool angle is too conservative due to the neglect of the dynamic characteristics, which not only reduces the machining efficiency, but also makes the milling system unstable due to the improper selection of the tool angle. At the same time, the cutting force in the cutting process is a necessary factor to maintain the stability of the cutting system and avoid vibration, so it is significant to design the tool based on the analysis about the milling force. In addition, a kind of self-excited vibration may occur in milling process to generate regenerative flutter, which will lead to poor surface finish, premature tool abrasion, and potential damage to the machine or tool. The emergence of regenerative flutter fundamentally limits the efficiency of mechanical processing. The unequal spiral angle tool has been proposed to avoid the regenerative flutter, which can reduce the probability of the flutter and reduce the vibration amplitude from the source, thus to reduce the abrasion rate of the tool and improve the processing quality of the workpiece surface through reasonable design.

Products for spiral angle tool have been carried out by applicants comprising Harbin University of Technology, Zhuzhou diamond cutting tools LTD., Mitsubishi composite materials co., to achieve the stable cutting to a certain extent. However, neither the design of above tools comes from the milling force in detailed, nor there is an experimental system that can choose machining tools according to different working conditions.

SUMMARY OF PRESENT INVENTION

A milling system and method under different lubrication conditions is provided in order to solve the above problems existing in the prior art, thereby realizing the storage of tools, providing lubricating oil to the milling surface, and choosing different tool according to different manufacturing conditions.

In order to achieve above objects, the technical solution adopted by the disclosure is as follows:

A milling system under different lubrication conditions comprises a lubrication system, a tool storage, a tool change system, a cutting system and a force measuring system, in which:

the lubrication system provides lubricating oil to the cutting system, the power source of the lubrication system is the high-pressure gas, the input frequency and volume of the high-pressure gas can be controlled through a frequency generator and a controlling valve, the quantity of the lubricating oil in the lubrication pump can be adjusted accordingly, then the lubricating oil can be provided to the cutting system through the nozzle interface in connection with the outlet interface of lubrication pump;

the tool storage comprises a rotatable rotating shaft, several tool components are distributed on the circumference of the rotating shaft, a spindle and a tool connected at the lower end of the spindle are arranged on each tool component, the spiral angles of each tool are not equal, the tool which is matched with the operating condition can be faced to the tool change system through the rotation of the rotating shaft;

the tool change system comprises two mechanical arms facing opposite directions, and a rotating shaft is provided at the middle of the two mechanical arms, the positions of the two mechanical arms can be conversed by controlling the rotation of the rotating shaft, and thus the spindle tool of the cutting system and the tool in the tool storage can be replaced accordingly;

the cutting system comprises a spindle on which a spindle tool is arranged, the spindle tool can be driven to rotate by controlling the rotation of the spindle to realize cutting processing;

the force measuring system is arranged at the lower end of the cutting system, it is used to measure the cutting force received by the workpiece fixed on it, so a tool with different spiral angles can be chosen for milling according to the machining parameters.

Further, the lubrication system comprises an inlet interface, a gas source processor, a lubrication pump, a nozzle, connection pipelines, and controlling valves arranged at each connection pipeline, the inlet interface is fixed on the gas source processor, the high-pressure gas entering through the inlet interface is filtered by the gas source processor and then provided to the lubrication system, an electromagnetic valve is fixed on the gas source processor through a two-way joint to control the entrance of the high-pressure gas, a three-way valve is connected with the outlet of the electromagnetic valve, the high-pressure gas enters a frequency generator through an outlet pipeline of the three-way valve, and the input frequency of the high-pressure gas can be controlled by the frequency generator, the high-pressure gas coming out of the frequency generator enters the lubrication pump through the pipelines, then the lubricating oil can be provided to the cutting system through the nozzle interface in connection with the outlet interface of lubrication pump.

Further, the high-pressure gas enters the lubrication pump through another outlet pipeline of the three-way valve, an oil cup is connected through threaded connection at one end and connected to a fixing cover of lubrication pump through threaded connection at the other end, the fixing cover of lubrication pump fixed on the box body is connected with the lubrication pump, the volume of the high-pressure gas can be adjusted through the gas volume control knob, and quantity of the lubricating oil can be adjusted through the oil quantity control knob.

Further, the tool storage comprises a motor box, a rotating shaft, a tool wheel and several tool components, the motor box drives the rotating shaft rotating around its axis, and hence driving the tool wheel located around the rotating shaft to rotate, several rooms are provided at the rim of the tool wheel, each room can accommodate a tool component, but the tool structures of each tool component are different.

Further, the tool structures are totally different, or partly same.

Further, the tool change system comprises a motor, a rotating shaft and at least two mechanical arms, the motor drives the rotating shaft to rotate, the two mechanical arms are located at the outer circumference of the rotating shaft and facing opposite directions, one is facing at the tool storage, and the other is facing at the cutting system, the positions of the two mechanical arms can be conversed by controlling the rotation of the rotating shaft, and thus the tool can be replaced accordingly.

Further, the force measuring system comprises a workbench, a workpiece holder and a measuring element, the workbench is placed right under the cutting system, the workpiece holder is fixed on the workbench, the workpiece with a degree of freedom can be completely fixed by the workpiece holder and the workbench, the measuring element can collect the cutting force received by the workpiece, the measured signal is amplified by an amplifier and then delivered to a force information collection device, in the end, the magnitude of the cutting force can be displayed on a computer through the delivery of wires.

Further, the workpiece holder comprises clamping elements on three directions (X-Y-Z axis), the clamping element at X-axis direction includes several positioning screws, the clamping element at Y-axis direction includes a fastening screw and a positioning block, one face of the positioning block contacts with the sideface of the workpiece, the other face contacts with the positioning screws, the positioning block can be tightened at X direction of the workpiece when the positioning screws are screwed up; the clamping element at Z-axis direction includes several clamping plates, each of which is a self-adjusting clamping plate, the device can be adjusted according to the size of the workpiece through the clamping elements on three directions, in order to meet the requirements of the size change of the workpiece.

Further, the tool is an unequal spiral angle tool including a handle component, a neck component and a blade component, the handle component is mounted on the spindle of the corresponding tool component, the blade component is connected with the handle component through the neck component, the blade component is provided with multiple spiral blades, and the spiral angles of the blades are different from each other.

Further, the optimal front angle of the unequal spiral angle tool is related to the material deformation coefficient, and the optimal range of the rear angle is 10°-15°.

Further, the tool component at least comprises a single-spiral-blade spiral angle tool and a multiple-spiral-blades spiral angle tool, the peak cutting force of the single-spiral-blade spiral angle tool decreases with the increase of the spiral angle of the tool, while the actual change of the cutting force of the multiple-spiral-blades spiral angle tool can be determined based on the bimodal decreasing and the eclipsing effect, then the critical spiral angle can be calculated, the peak cutting force decreases when the spiral angle is smaller than the critical spiral angle and increases when the spiral angle is larger than the critical spiral angle.

A operating method according to above milling systems comprises: selecting the best angle difference of the unequal spiral angle tool according to different conditions comprising dry cutting, casting-type lubrication, minimal quantities of lubrication or minimal quantities of nanofluid lubrication, and/or choosing the optimal tool according to different cutting parameters, in order to obtain the minimum milling force.

Further, the method also comprises: selecting the equal spiral angle tool with the minimum milling force according to the diameter and axial cutting depth of the tool when cutting.

Advantages can be achieved according to the disclosure compared with prior art are as follows:

1) A tool choosing system for milling in different manufacturing conditions is provided, workpiece is milled by the tool, the milling force is measured by the force measuring device, the tool is changed by the tool change system, the tools are stored in the tool storage, the lubricating oil is provided to the milling surface by the lubrication system. It can realize milling under different conditions comprising dry cutting, casting-type lubrication, minimal quantities of lubrication or minimal quantities of nanofluid lubrication, and/or choose the optimal tool according to different cutting parameters in order to enhance the service life of the tool.

2) Multiple unequal spiral angle tools in the tool storage can be chosen and replaced, which can reduce the probability of the flutter and reduce the vibration amplitude from the source, thus to reduce the abrasion rate of the tool and improve the processing quality of the workpiece surface.

3) The parameters of the unequal spiral angle tool can be designed to reduce the milling force, and further reducing the cutting heat and improving the quality of the workpiece surface.

DESCRIPTION OF THE DRAWINGS

The drawings that are part of the disclosure are intended to provide a further understanding of this application. The illustrative embodiments of the disclosure and the explanations for them are used as descriptions but not improper limitations of the disclosure.

Figure 1:
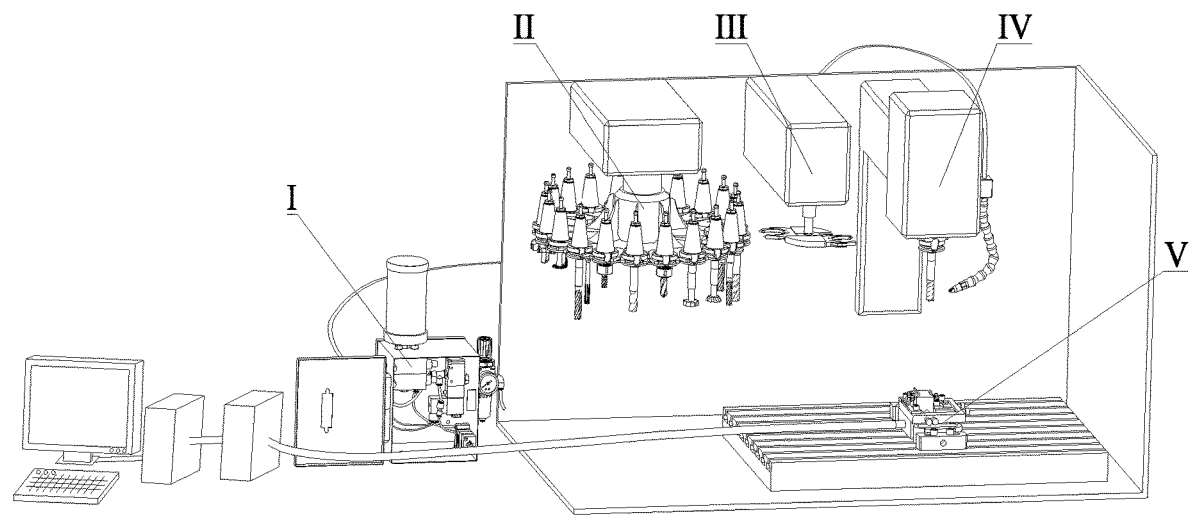
FIG. 1 is an isometric view of a milling system under different lubrication conditions.

In which: lubrication system I, tool storage II, tool change system III, cutting system IV, force measuring system V; box body I-1, interface of oil cup I-2, oil cup I-3, fixing screw I-4, gasket I-5, fixing screw I-6, fixing cover of lubrication pump I-7, precise minimum quantity lubrication pump I-8, gas volume control knob I-9, three-way valve I-10, electromagnetic valve I-11, gas source processor I-12, inlet interface I-13, two-way joint I-14, frequency generator I-15, pipeline I-16, pipeline I-17, pipeline I-18, oil quantity control knob I-19, outlet interface of lubrication pump I-20; motor box II-1, spindle II-2, tool wheel II-3, tool II-4; motor box III-1, mechanical arm III-2, mechanical arm III-3; motor box IV-1, pipeline IV-2, screw IV-3, gasket IV-4, magnetic chuck IV-5, nozzle interface IV-6, fixing cover of lubrication pump IV-7, spindle IV-8, nozzle IV-9, tool IV-10, workbench IV-11; computer V-1, wires V-2, force information collection device V-3, amplifier V-4, clamping plate V-5, cylinder gasket V-6, clamp nut V-7, clamp screw V-8, workpiece V-9, flat-plate screw V-10, micro clamp screw V-11, positioning screw V-12, workpiece holder V-13, positioning block V-14, force measuring device V-15, screw V-16, holder screw V-17, flat plate V-18, flat plate V-19; rear angle II-4-1, back surface of the tool II-4-2, front angle II-4-3, chip groove II-4-4, front surface of the tool II-4-5.

DETAILED DESCRIPTION OF PREFERRED EMBODIMENTS

The present disclosure will be further described according to the drawings and embodiments in the following.

It should be noted that the following details are illustrative and intended to provide further description of this disclosure. Unless indicated otherwise, the meanings of all technical and scientific terms used herein are same with what would normally be understood by the skilled in the art.

It should be noted that the terms used herein are only intended to describe the detailed embodiments, but not limit the embodiments based on the disclosure. As used herein, unless indicated explicitly otherwise, the singular is intended to include the plural. And it should also be understood that, the terms "include" and/or "comprise" used in this disclosure indicate the presence of the features, steps, operations, devices, components and/or a combination thereof.

In the disclosure, the terms indicating the orientations or positions, such as "up", "down", "left", "right", "front", "back" "vertical", "horizontal", "lateral", "bottom", etc., are used according to the orientations or positions shown in the drawings. They are only used to describe the structural relationship between the components or elements of the disclosure, but not specifically refer to any component or element of the disclosure, which are not used as the limitation of the disclosure.

In the present disclosure, terms such as "fix", "joint" and "connect" shall be generally understood, which means that, each of them may mean fixed connection, integral connection or detachable connection, direct connection or indirect connection through intermediate medium. The skilled in the art can define the specific meaning of the terms in the disclosure according to the specific situation, but not regard them as the limitations of the disclosure.

FIG. 1 is an isometric view of a milling system under different lubrication conditions.

Referring to FIG. 1, the milling system according to the present disclosure comprises a lubrication system I, a tool storage II, a tool change system III, a cutting system IV, and a force measuring system V. The lubrication system I is used to provide lubricating oil for cooling and lubricating, the tool storage II is used to store tools, the tool change system III is used to select tools, the cutting system IV is used to milling the workpiece, the force measuring system V is used to measure the milling force when milling the workpiece.

Figure 2:
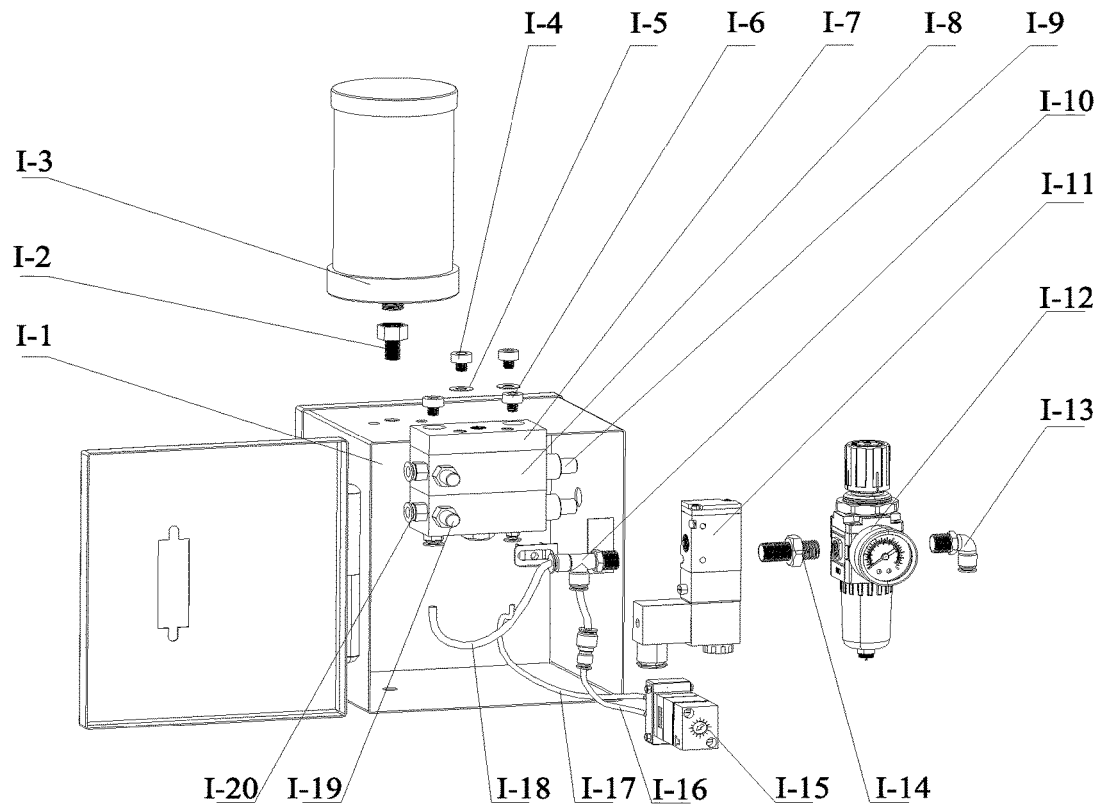
FIG. 2 is an exploded assembly drawing of the milling system.

FIG. 2 is an exploded assembly drawing of the milling system.

Referring to FIG. 2, the lubrication system comprises a box body I-1, an interface of oil cup I-2, an oil cup I-3, a fixing screw I-4, a gasket I-5, a fixing screw I-6, a fixing cover of lubrication pump I-7, a precise minimum quantity lubrication pump I-8, a gas volume control knob I-9, a three-way valve I-10, an electromagnetic valve I-11, a gas source processor I-12, an inlet interface I-13, a two-way joint I-14, a frequency generator I-15, pipeline I-16, pipeline I-17, pipeline I-18, an oil quantity control knob I-19, and an outlet interface of lubrication pump I-20.

The inlet interface I-13 is fixed on the gas source processor I-12. The high-pressure gas entering through the inlet interface I-13 is filtered in the gas source processor I-12 and then provided to the lubrication system. The electromagnetic valve I-11 is connected with the gas source processor I-12 through a two-way joint I-14 to control the entrance of the high-pressure gas. The three-way valve I-10 is connected with the outlet of the electromagnetic valve I-11. The high-pressure gas can enter the frequency generator I-15 through one outlet pipeline I-16 of the three-way valve I-10. So the input frequency of the high-pressure gas can be controlled by the frequency generator I-15. The high-pressure gas coming out of the frequency generator I-15 will enter the precise minimum quantity lubrication pump I-8 through the pipeline I-17. In addition, the high-pressure gas can directly enter the precise minimum quantity lubrication pump I-8 through another outlet pipeline I-18 of the three-way valve I-10. The interface of oil cup I-2 is connected through threaded connection at one end and connected to the fixing cover of lubrication pump I-7 through threaded connection at the other end. The fixing cover of lubrication pump I-7 is connected with the precise minimum quantity lubrication pump I-8 through two fixing screws I-6, and fixed on the box body I-1 through two fixing screws I-4 and the gaskets I-5. The volume of the high-pressure gas can be adjusted through the gas volume control knob I-9, and the quantity of the lubricating oil can be adjusted through the oil quantity control knob I-19. In the end, the lubricating oil can be provided to the cutting system IV through the nozzle interface IV-6 in connection with the outlet interface I-20 of lubrication pump I-20.

Figure 3:
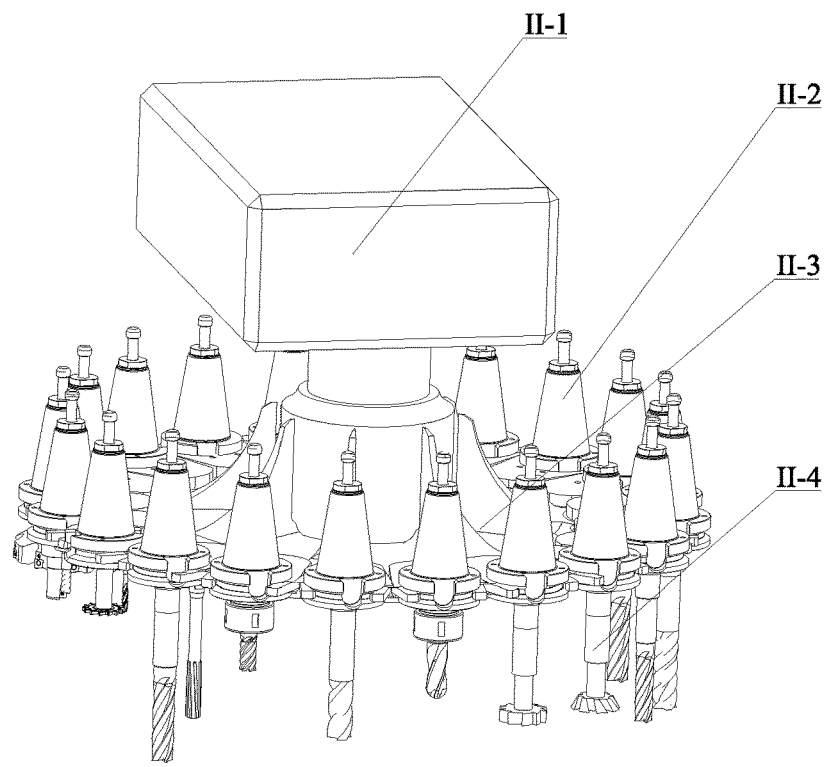
FIG. 3 is an isometric view of the tool storage.
Figure 4:
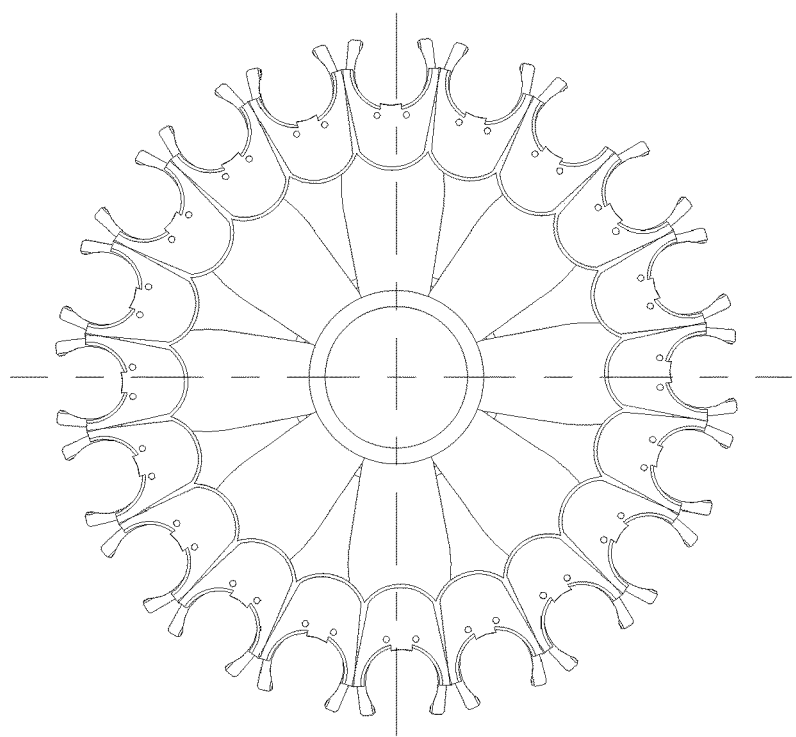
FIG. 4 is a top view of the tool wheel.
Figure 5:
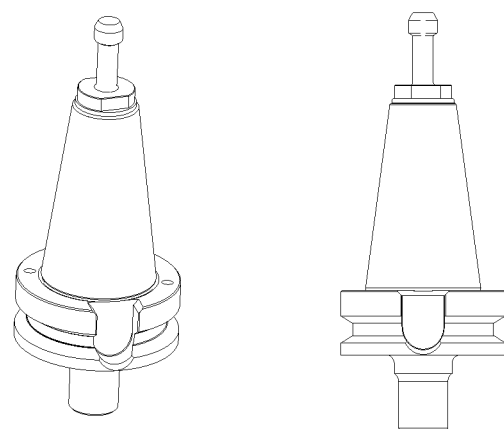
FIG. 5 is an isometric view and front view of the spindle.
Figure 6:
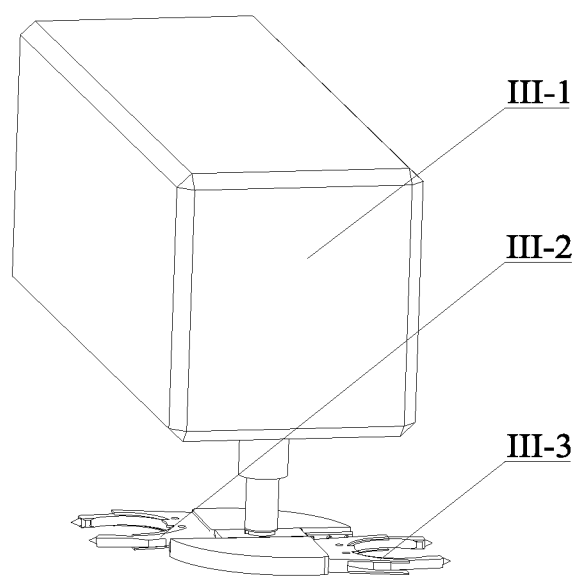
FIG. 6 is an isometric view of the tool change system.

FIG. 3 is an isometric view of the tool storage. FIG. 4 is a top view of the tool wheel. FIG. 5 is an isometric view and front view of the spindle. FIG. 6 is an isometric view of the tool change system.

Referring to FIG. 3-6, the motor box II-1 can drive the tool wheel II-3 to rotate through its internal structure, so as to drive the spindle II-2 and the tool II-4 on the tool wheel II-3 to rotate. Besides, the location conversion of the mechanical arm III-2 and the mechanical arm III-3 can be realized by the motor box III-1 through its internal structure, and the replacement of the tool can be realized accordingly. As a result, different tools can be chosen according to different processing conditions.

Figure 7:
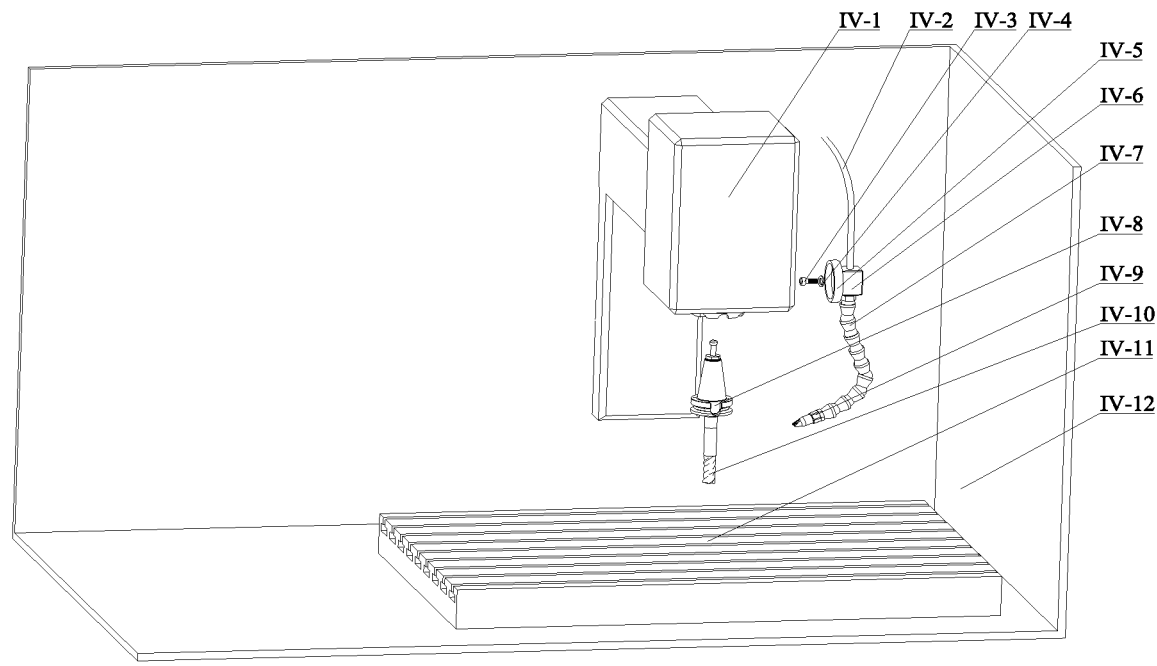
FIG. 7 is an isometric view of the cutting system.

FIG. 7 is an isometric view of the cutting system. The motor box IV-1 can drive the spindle IV-8 to rotate through its internal structure, and thus driving the tool IV-10 to rotate to cut. The lubricating oil provided by the lubrication system I can be injected to the cutting area through the pipeline IV-2, the nozzle pipeline IV-7 and the nozzle IV-9. The magnetic chuck IV-5 attached on the box body of the motor box IV-1 is fixed with the nozzle interface IV-6 through the screw IV-3 and the gasket IV-4.

Figure 8:
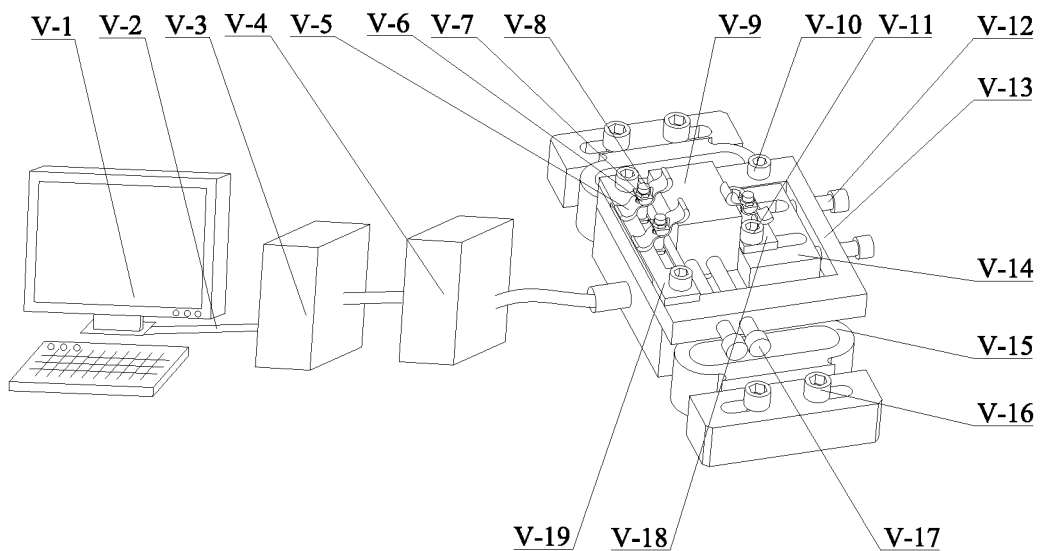
FIG. 8 is an isometric view of the force measuring system.
Figure 9:
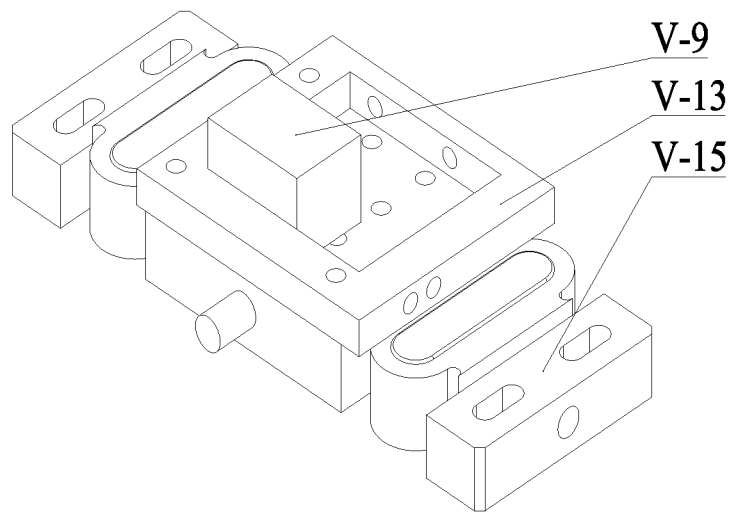
FIG. 9 is diagram showing the fastened and positioned workpiece.
Figure 10:
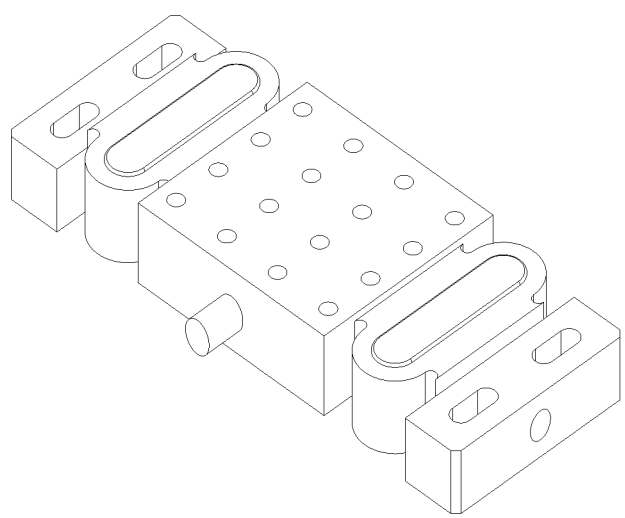
FIG. 10 is an isometric view of the milling force measuring element.

FIG. 8 is an isometric view of the force measuring system. FIG. 9 is diagram showing the fastened and positioned workpiece. FIG. 10 is an isometric view of the milling force measuring element.

Referring to FIG. 8-10, the force measuring device V-15 is fixed on the workbench IV-11 through the screw V-16. The workpiece holder V-13 is fixed on the workbench of the force measuring device V-15. The workpiece V-9 can be completely limited in 6 directions by the workpiece holder V-13 and the workbench of the force measuring device V-15 when on the workbench. The workpiece V-9 is fastened at X-axis direction through two positioning screws V-12, and at Y-axis direction through the holder screw V-17. One face of the positioning block V-14 contacts with the sideface of the workpiece V-9, the other face contacts with the two positioning screws V-12, the positioning block V-14 can be tightened at X direction of the workpiece V-9 when the positioning screws V-12 are screwed up. The workpiece V-9 is tightened at Z-axis direction through three clamping plates V-5. The clamping plates V-5, the flat plate V-18, the flat plate V-19, the cylinder gasket V-6, the clamp screw V-8, and the clamp nut V-7 make up a self-adjusting clamping plate. The device can be adjusted according to the size of the workpiece V-9 through the clamp screws V-17, the positioning screws V-12 and the clamping plates V-5, in order to meet the requirements of the size change of the workpiece. The positioning block V-14 is tightened through the micro clamp screw V-11 and the positioning screw V-12. When the workpiece V-9 is being cut, the measured signal is amplified by the amplifier V-4 and then delivered to the force information collection device V-3, in the end, the magnitude of the cutting force can be displayed on the computer V-1 through the delivery of wires V-2.

Figure 11:
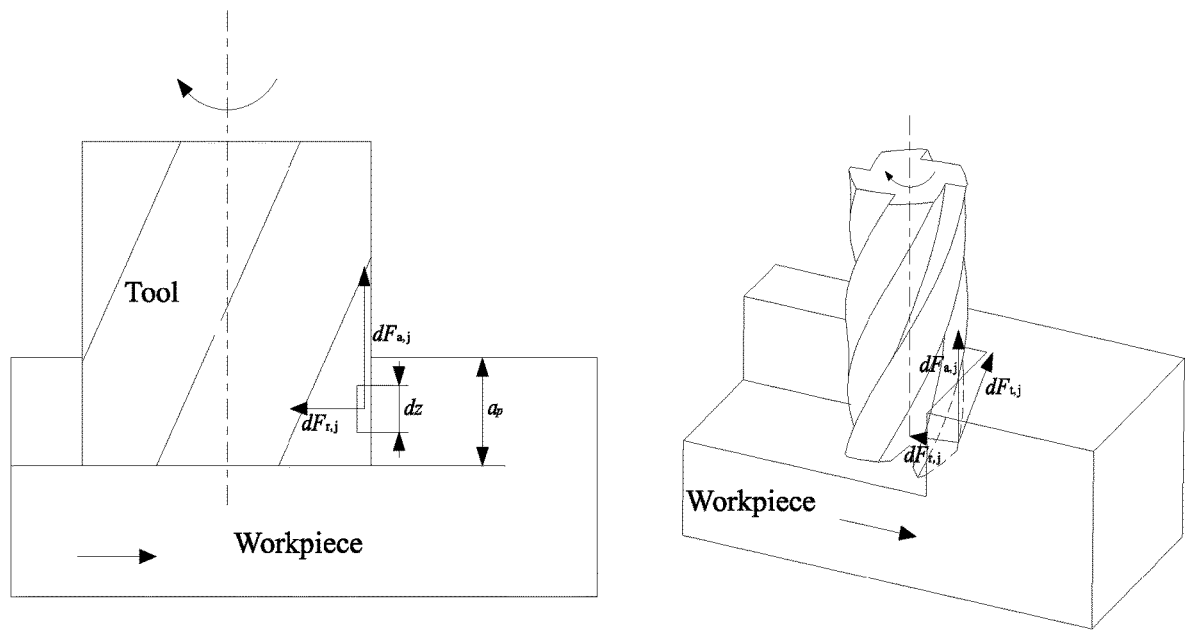
FIG. 11 is an analysis diagram of the milling force.
Figure 12:
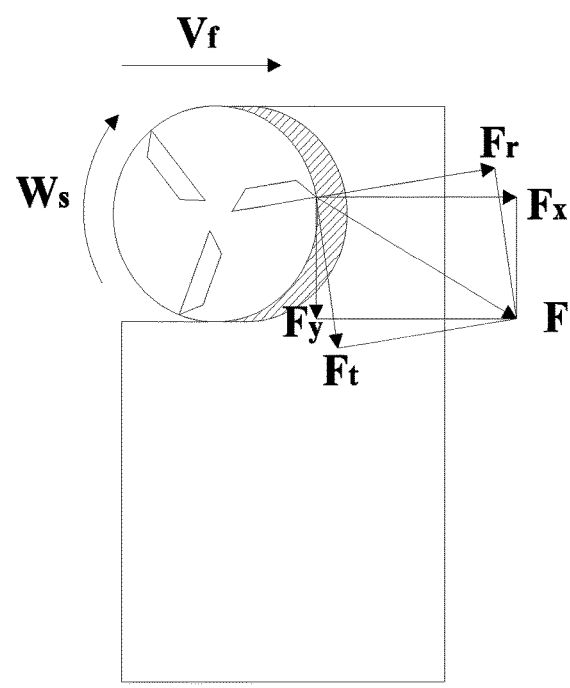
FIG. 12 is a diagram showing the force conversion.
Figure 13:
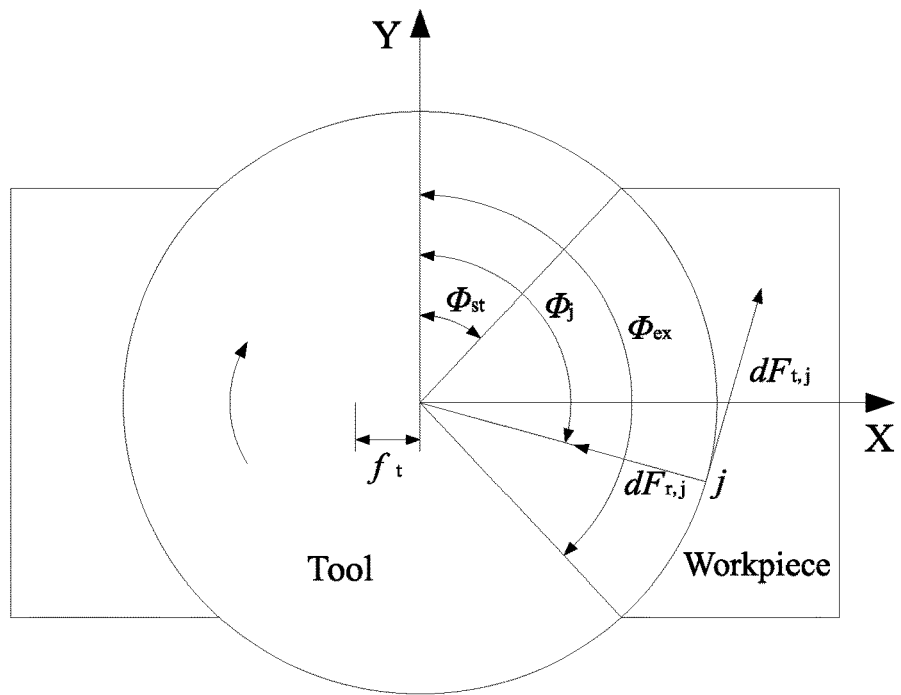
FIG. 13 is an illustrative diagram of the cut-in angle and cut-out angle.
Figure 14:
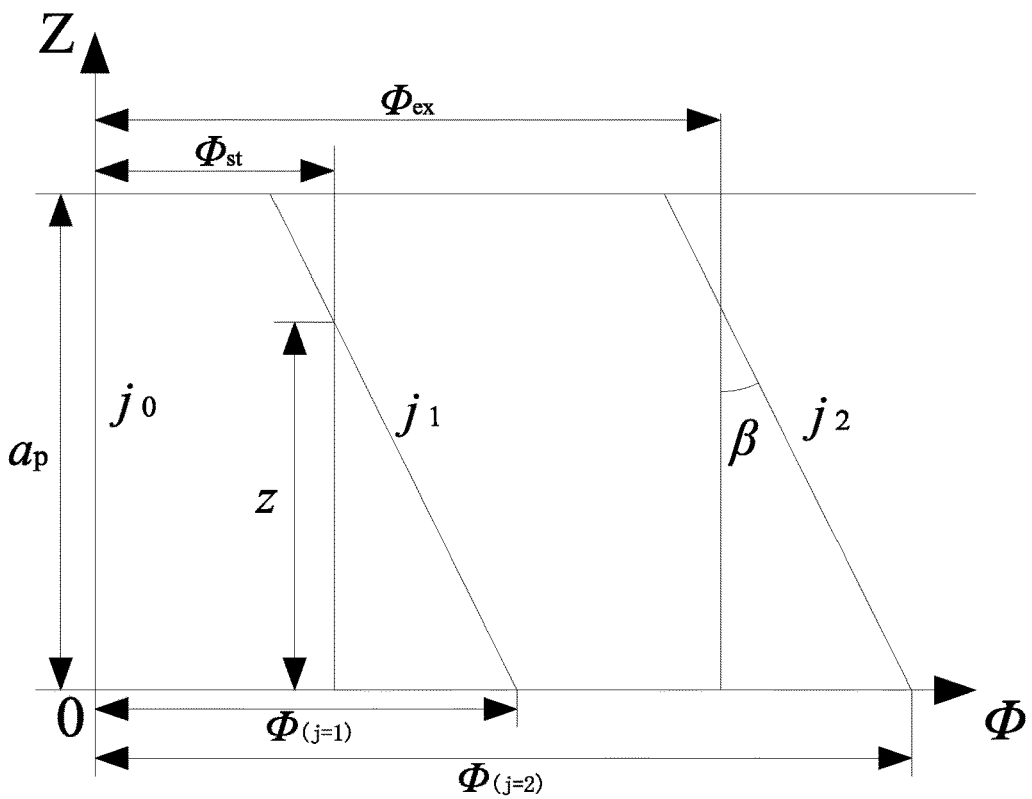
FIG. 14 is a diagram showing the cutting by multiple blades.

FIG. 11 is an analysis diagram of the milling force. FIG. 12 is a diagram showing the force conversion. FIG. 13 is an illustrative diagram of the cut-in angle and cut-out angle. FIG. 14 is a diagram showing the cutting by multiple blades.

Referring to FIG. 11-14, analysis for the milling force is done. When milling, the tangential force $F_t(\phi)$, the radial force $F_r(\phi)$, the axial force $F_a(\phi)$ are represented as:

$$\begin{cases} dF_{t,j}(\phi) = K_{tc}h_j[\phi_j(z)]dz + K_{te}dz \\ dF_{r,j}(\phi) = K_{rc}h_j[\phi_j(z)]dz + K_{re}dz \\ dF_{a,j}(\phi) = K_{ac}h_j[\phi_j(z)]dz + K_{ae}dz \end{cases} \quad (1)$$

$$h_j[\phi_j(z)] = f_t\sin\phi_j(z) \quad (2)$$

Wherein, $K_{tc}$, $K_{rc}$, $K_{ac}$ respectively represents cutting force coefficients of tangential, radial, and axial lines, $K_{tc}$, $K_{rc}$, $K_{ac}$ respectively represents corresponding marginal force coefficients, namely the plowing coefficients resulted from the friction or plowing of the back surface of the cutting blade, dz represents the thickness of each element, h($\phi$) represents the instantaneous chip thickness (periodical variation), $f_t$ represents the feed rate (mm/r), $\phi$ represents the instantaneous tooth position angle (°). Equations 1 and 2 are modified as follows:

$$\begin{cases} dF_{t,j}(\phi) = [K_{tc}f_t\sin\phi_j(z) + K_{te}]dz \\ dF_{r,j}(\phi) = [K_{rc}f_t\sin\phi_j(z) + K_{re}]dz \\ dF_{a,j}(\phi) = [K_{ac}f_t\sin\phi_j(z) + K_{ae}]dz \end{cases} \quad (3)$$

Referring to FIG. 12, the horizontal force and the normal force can be deduced from the tangential force and the radial force:

$$\begin{cases} dF_{x,j}(\phi, z) = -dF_{t,j}(\phi, z)\cos\phi_j(z) - dF_{r,j}(\phi, z)\sin\phi_j(z) \\ dF_{y,j}(\phi, z) = +dF_{t,j}(\phi, z)\sin\phi_j(z) - dF_{r,j}(\phi, z)\cos\phi_j(z) \\ dF_{z,j}(\phi, z) = dF_{a,j}(\phi, z) \end{cases} \quad (4)$$

Equations 3 and 4 are modified as follows:

$$\begin{cases} dF_{x,j}(\phi, z) = -[K_{tc}f_t\sin\phi_j(z) + K_{te}]\cos\phi_j(z)dz - [K_{rc}f_t\sin\phi_j(z) + K_{re}]\sin\phi_j(z)dz \\ dF_{y,j}(\phi, z) = [K_{tc}f_t\sin\phi_j(z) + K_{te}]\sin\phi_j(z)dz - [K_{rc}f_t\sin\phi_j(z) + K_{re}]\cos\phi_j(z)dz \\ dF_{z,j}(\phi, z) = [K_{ac}f_t\sin\phi_j(z) + K_{ae}]dz \end{cases} \quad (5)$$

$$\begin{cases} dF_{x,j}(\phi, z) = \left\{\frac{f_t}{2}[-K_{tc}\sin2\phi_j(z) - K_{rc}(1 - \cos2\phi_j(z))] + [-K_{te}\cos\phi_j(z) - K_{re}\sin\phi_j(z)]\right\}dz \\ dF_{y,j}(\phi, z) = \left\{\frac{f_t}{2}[K_{tc}(1 - \cos2\phi_j(z)) - K_{rc}\sin2\phi_j(z)] + [K_{te}\sin\phi_j(z) - K_{re}\cos\phi_j(z)]\right\}dz \\ dF_{z,j}(\phi, z) = [K_{ac}f_t\sin\phi_j(z) + K_{ae}]dz \end{cases} \quad (6)$$

$$F_q(\phi_j(z)) = F_q(\phi(z)) = \int_{z_{j,1}}^{z_{j,2}} dF_q(\phi, z), \quad q = x, y, z \quad (7)$$

Referring to FIG. 13, cutting force only generate when the tool is in the cutting area, namely:

Down milling: when $\phi_{st} \leq \phi \leq \phi_{ex}$, $F_x$, $F_y$, $F_z \geq 0$, $$\left(\phi_{st} = \pi - \arccos\frac{R - a_p}{R}, \phi_{ex} = \pi\right)$$

Up milling: when $\phi_{ex} \leq \phi \leq \phi_{st}$ $F_x$, $F_y$, $F_z \geq 0$, $$\left(\phi_{st} = \pi, \phi_{et} = \pi - \arccos\frac{R - a_p}{R}\right)$$

Wherein, $\phi_{st}$, $\phi_{ex}$ respectively represents the cut-in angle and cut-out angle of the tool, R represents the radius of the tool, $a_p$ represents the radial cutting depth.

$$\phi_j(z) = 2\pi nt - (j-1)\frac{2\pi}{N} - \frac{2z\tan\beta}{R} \tag{8}$$

Wherein, n represents the rotate speed of the tool, t represents the time, N represents the amount of tool teeth, $a_e$ represents the axial cutting depth, β represents the spiral angle, j represents that the $j^{th}$ tooth is cutting.

Besides, it should be noted that there may be several teeth cutting at the same time, which depends on the amount of the tool teeth and the radial cutting thickness. The tooth spacing angle of the tool is given as follows:

$$\phi_p = \frac{2\pi}{N} \tag{9}$$

When the angle swept by the tool teeth is larger than the tooth spacing angle, more than one teeth are cutting at the same time. When several teeth are cutting, contribution of each tooth to the total feed force and the normal cutting force should be taken into consideration. Meanwhile, it should be noted that, the cutting thickness at the instantaneous cutting position of each tooth will be different since there is a tooth spacing angle between each two teeth of the tool.

What can be deduced from the quotation 8 is as follows:

$$d\phi_j(z) = -\frac{2\tan\beta}{R}dz \tag{10}$$

$$dz = -\frac{R}{2\tan\beta}d\phi_j(z), \begin{cases} z = z_{j,1} \to \phi_j(z) = \phi_j(z_1) \\ z = z_{j,2} \to \phi_j(z) = \phi_j(z_2) \end{cases} \tag{11}$$

The quotation 7 can be modified as follows:

$$F_q(\phi_j(z)) = -\frac{R}{2\tan\beta}\int_{\phi_j(z_1)}^{\phi_j(z_2)} dF_q(\phi_j(z)), q = x, y, z \tag{12}$$

The quotation 12 and quotation 6 can be modified as follows:

$$\begin{cases} F_{x,j}(\phi(z)) = -\frac{R}{2\tan\beta}\int_{\phi_j(z_1)}^{\phi_j(z_2)} \left\{\frac{f_t}{2}[-K_{tc}\sin 2\phi_j(z) - K_{rc}(1 - \cos 2\phi_j(z))] + [-K_{te}\cos\phi_j(z) - K_{re}\sin\phi_j(z)]\right\}d\phi \\ F_{y,j}(\phi(z)) = -\frac{R}{2\tan\beta}\int_{\phi_j(z_1)}^{\phi_j(z_2)} \left\{\frac{f_t}{2}[K_{tc}(1 - \cos 2\phi_j(z)) - K_{rc}\sin 2\phi_j(z)] + [K_{te}\sin\phi_j(z) - K_{re}\cos\phi_j(z)]\right\}d\phi \\ F_{z,j}(\phi(z)) = -\frac{R}{2\tan\beta}\int_{\phi_j(z_1)}^{\phi_j(z_2)} [K_{ac}f_t\sin\phi_j(z) + K_{ae}]d\phi \end{cases} \tag{13}$$

$$\begin{cases} F_{x,j}(\phi(z)) = \left\{-\frac{Rf_t}{8\tan\beta}[K_{tc}\cos 2\phi_j(z) - K_{rc}(2\phi_j(z) - \sin 2\phi_j(z))] + \frac{R}{2\tan\beta}[K_{te}\sin\phi_j(z) - K_{re}\cos\phi_j(z)]\right\}_{\phi_j(z_1)}^{\phi_j(z_2)} \\ F_{y,j}(\phi(z)) = \left\{-\frac{Rf_t}{8\tan\beta}[K_{tc}(2\phi_j(z) - \sin 2\phi_j(z)) - K_{rc}\cos 2\phi_j(z)] + \frac{R}{2\tan\beta}[K_{te}\cos\phi_j(z) + K_{re}\sin\phi_j(z)]\right\}_{\phi_j(z_1)}^{\phi_j(z_2)} \\ F_{z,j}(\phi(z)) = \left\{\frac{Rf_t}{2\tan\beta}[K_{ac}\cos\phi_j(z) + \frac{R}{2\tan\beta}K_{ae}\phi_j(z)]\right\}_{\phi_j(z_1)}^{\phi_j(z_2)} \end{cases} \tag{14}$$

What is obtained considering the influence of interrupted cut when $\phi_{st} \leq \phi \leq \phi_{ex}$ is as follows:

$$A(\phi)\begin{cases} 1 & \phi_{st} \leq \phi \leq \phi_{ex} \\ 0 & \text{else} \end{cases} \tag{15}$$

Each item in the sum formula represents the contribution of each tooth made to the cutting force. The contribution of tool tooth j made to the total cutting force will be zero if it is out of the cutting area.

The estimated value of milling force in each direction can be summarized through quotation 16, and the real-time milling force while cutting can be simulated.

$$F_x = \sum_{j=1}^{N} A(\phi)F_{x,j}(\phi_j), \tag{16}$$

-continued $$F_y = \sum_{j=1}^{N} A(\phi)F_{y,j}(\phi_j),$$

$$F_z = \sum_{j=1}^{N} A(\phi)F_{z,j}(\phi_j)$$

The marginal force coefficient can be ignored when calculating the best spiral angle of the tool since it makes little influence to the force in three directions. For example, single-blade cutting is considered first to study the influence rule between the spiral angle and the milling force in Y-axis direction.

Wherein, $\phi(z_1) = \phi(0) = \phi$, $$\phi(z_2) = \phi(a_p) = \phi - \frac{a_p \tan\beta}{R},$$

the force in Y-axis direction can be obtained according to quotation 16 as follows:

$$F_y = \frac{K_{tc}f_t a_p}{2} + \frac{K_{tc}f_t R}{4\tan\beta}\sqrt{\left(\frac{K_{rc}}{K_{tc}}\right)^2 + 1}\left\{\sin\left[2\left(\phi - \frac{a_p\tan\beta}{R}\right) - \theta\right] - \sin(2\phi - \theta)\right\} \quad (17)$$

Wherein, $$\tan\theta = \frac{K_{rc}}{K_{tc}}, \psi = \sqrt{\left(\cos\frac{2a_p\tan\beta}{R} - 1\right)^2 + \left(\sin\frac{2a_p\tan\beta}{R}\right)^2}.$$

What can be obtained is $$F_y = \frac{K_{tc}f_t a_p}{2} + \frac{K_{tc}f_t R}{4\tan\beta}\sqrt{\left(\frac{K_{rc}}{K_{tc}}\right)^2 + 1} \cdot \sin\frac{a_p\tan\beta}{R}\sin(2\phi - \theta - \theta').$$

Wherein, $$\tan\theta' = \frac{\sin(2a_p\tan\beta/R)}{\cos(2a_p\tan\beta/R) - 1}.$$

The peak force can be achieved when $$2\phi - \theta - \theta' = \frac{\pi}{2} + 2k\pi (k = 0, 1, 2, \ldots).$$

Derivation can be done to $F_{ymax}$:

$$F_{ymax} = \frac{K_{tc}f_t a_p}{2} + \frac{K_{tc}f_t R}{2\tan\beta}\sqrt{\left(\frac{K_{rc}}{K_{tc}}\right)^2 + 1} \cdot \sin\frac{a_p\tan\beta}{R} \quad (18)$$

$$\frac{dF_{ymax}}{d\beta} \propto d\left(\frac{\sin\frac{a_p\tan\beta}{R}}{\tan\beta}\right)/d\beta \cos\frac{a_p\tan\beta}{R}\frac{1}{\sin^2\beta}\left(\frac{a_p}{R}\tan\beta - \tan\frac{a_p\tan\beta}{R}\right)$$

when $$\frac{a_p\tan\beta}{R} \leq \frac{\pi}{2}, \text{ since } \cos\frac{a_p\tan\beta}{R} \geq 0 \text{ and } \frac{1}{\sin^2\beta} \geq 0,$$

the symbols of $$\frac{dF_{ymax}}{d\beta} \text{ and } \frac{a_p}{R}\tan\beta - \tan\frac{a_p\tan\beta}{R}$$

are same, when $$\beta = 0, \frac{a_p}{R}\tan\beta - \tan\frac{a_p\tan\beta}{R} = 0, \text{ so}$$

$$d\left(\frac{a_p}{R}\tan\beta - \tan\frac{a_p\tan\beta}{R}\right)/d\beta = \left(1 - \frac{1}{\cos^2\frac{a_p\tan\beta}{R}}\right)\frac{a_p}{R}\frac{1}{\cos^2\beta} \leq 0.$$

It is monotonic decreasing and the maximum is 0, so it's always smaller than 0.

When $$\frac{\pi}{2} \leq \frac{a_p\tan\beta}{R} \leq \pi, \frac{a_p}{R}\cos\frac{a_p\tan\beta}{R}\frac{1}{\cos^2\beta}\tan\beta \leq 0;$$

otherwise, $$\sin\frac{a_p\tan\beta}{R}\frac{1}{\cos^2\beta} \geq 0.$$

$$\frac{dF_{ymax}}{d\beta} \propto d\left(\frac{\sin\frac{a_p\tan\beta}{R}}{\tan\beta}\right)/d\beta = \frac{(a_p/R)\cos(a_p\tan\beta/R)}{\tan^2\beta} \cdot \frac{(1/\cos^2\beta)\tan\beta - \sin(a_p\tan\beta/R)(1/\cos^2\beta)}{\tan^2\beta} \leq 0 \quad (20)$$

The above analysis shows that the peak cutting force decreases with the increase of the spiral angle of the tool.

The spiral angle can be chosen considering multi-blade eclipsing effect referring to FIG. 14. When $$\frac{a_p\tan\beta}{R} \geq \frac{2\pi}{N},$$

there are several cutting blades cutting at the same time. So the actual change of the cutting force can be determined based on the bimodal decreasing and the eclipsing effect. It means that, there may be critical value of the spiral angle $\beta$ for the peak cutting force, the peak cutting force will decrease when the spiral angle is smaller than the critical value and increases when the spiral angle is larger than the critical value.

Eclipsing effect may take place only when the cut-in angle $\phi_{st}$ and cut-out angle $\phi_{ex}$ meet the following conditions, $$\phi_{ex} - \phi_{st} \leq \frac{2\pi}{N},$$

the critical spiral angle can be calculated when two cutting blades is cutting at the same time, and the force at Y-axis direction is represented as follows:

$$F_y = -\frac{K_t f_t R}{2\tan\beta}\left(\phi(z) - \frac{\sin 2\phi(z)}{2} + \frac{K_r}{K_t}\frac{\cos 2\phi(z)}{2}\right)\Big|_\phi^{\phi_{st}} - \qquad (21)$$

$$\frac{K_t f_t R}{2\tan\beta}\left(\phi(z) - \frac{\sin 2\phi(z)}{2} + \frac{K_r}{K_t}\frac{\cos 2\phi(z)}{2}\right)\Big|_{\phi_{ex}}^{\phi+(2\pi/N)-(a_p\tan\beta/R)}$$

$$F_y = \qquad (22)$$
$$\frac{K_t f_t R}{2\tan\beta}\left(\phi_{ex} - \frac{\sin 2\phi_{ex}}{2} + \frac{K_r}{K_t}\frac{\cos 2\phi_{ex}}{2} - \phi_{st} + \frac{\sin 2\phi_{st}}{2} - \frac{K_r}{K_t}\frac{\cos 2\phi_{st}}{2}\right) +$$

$$\frac{K_t f_t R}{2\tan\beta}\sqrt{\left(\frac{K_r}{K_t}\right)^2 + 1}\sin\left(\frac{a_p\tan\beta}{R} - \frac{2\pi}{N}\right)\sin(2\phi - \theta - \theta'') +$$

$$\frac{K_t f_t R}{2\tan\beta}\left(\frac{a_p\tan\beta}{R} - \frac{2\pi}{N}\right)$$

What is defined:

$$\tan\theta = \frac{K_r}{K_t},\ \tan\theta'' = \frac{\sin 2\left(\frac{a_p\tan\beta}{R} - \frac{2\pi}{N}\right)}{\cos 2\left(\frac{a_p\tan\beta}{R} - \frac{2\pi}{N}\right) - 1},$$

When $$2\phi - \theta - \theta'' = \frac{\pi}{2} + 2k\pi (k = 0, 1, 2, \ldots),$$

the peak force in Y-axis direction can be achieved:

$$F_{ymax} = \qquad (23)$$
$$\frac{K_t f_t R}{2\tan\beta}\left(\phi_{ex} - \frac{\sin 2\phi_{ex}}{2} + \frac{K_r}{K_t}\frac{\cos 2\phi_{ex}}{2} - \phi_{st} + \frac{\sin 2\phi_{st}}{2} - \frac{K_r}{K_t}\frac{\cos 2\phi_{st}}{2}\right) +$$

$$\frac{K_t f_t R}{2\tan\beta}\sqrt{\left(\frac{K_r}{K_t}\right)^2 + 1}\sin\left(\frac{a_p\tan\beta}{R} - \frac{2\pi}{N}\right) + \frac{K_t f_t R}{2\tan\beta}\left(\frac{a_p\tan\beta}{R} - \frac{2\pi}{N}\right)$$

Derivation can be done to $F_{ymax}$:

$$\frac{dF_{ymax}}{d\beta} = \frac{K_t f_t R}{2\sin^2\beta}\sqrt{\left(\frac{K_r}{K_t}\right)^2 + 1}\cos\left(\frac{a_p\tan\beta}{R} - \frac{2\pi}{N}\right)\frac{a_p\tan\beta}{R} - \qquad (24)$$

$$\frac{K_t f_t R}{2\sin^2\beta}\sqrt{\left(\frac{K_r}{K_t}\right)^2 + 1}\sin\left(\frac{a_p\tan\beta}{R} - \frac{2\pi}{N}\right) -$$

$$\frac{K_t f_t R}{2\sin^2\beta}\sqrt{\left(\frac{K_r}{K_t}\right)^2 + 1}\sin\phi_{st}\cos(\phi_{st} - \theta) + \frac{K_t f_t R}{2\sin^2\beta}\left[\frac{2\pi}{N} - (\phi_{ex} - \phi_{st})\right]$$

What can be obtained according to the quotation $$\phi_{ex} - \phi_{st} \leq \frac{2\pi}{N}\ \text{and}\ \frac{a_p\tan\beta}{R} \geq \frac{2\pi}{N}$$

is as follows:

$$\frac{dF_{ymax}}{d\beta} \geq \frac{K_t f_t R}{2\sin^2\beta}\sqrt{\left(\frac{K_r}{K_t}\right)^2 + 1}\cos\left(\frac{a_p\tan\beta}{R} - \frac{2\pi}{N}\right)\frac{a_p\tan\beta}{R} - \qquad (25)$$

$$\frac{K_t f_t R}{2\sin^2\beta}\sqrt{\left(\frac{K_r}{K_t}\right)^2 + 1}\cos\left(\frac{a_p\tan\beta}{R} - \frac{2\pi}{N}\right)\frac{a_p\tan\beta}{R} -$$

$$\frac{K_t f_t R}{2\sin^2\beta}\sqrt{\left(\frac{K_r}{K_t}\right)^2 + 1}\sin$$

$$\phi_{st}\cos(\phi_{st} - \theta)\infty\cos\left(\frac{a_p\tan\beta}{R} - \frac{2\pi}{N}\right)\frac{a_p\tan\beta}{R} -$$

$$\sin\left(\frac{a_p\tan\beta}{R} - \frac{2\pi}{N}\right) - \sin\phi_{st}\cos(\phi_{st} - \theta) \geq \chi_1$$

Wherein, $$\chi_1 = \cos\left(\frac{a_p\tan\beta}{R} - \frac{2\pi}{N}\right)\frac{2\pi}{N} - \sin\left(\frac{a_p\tan\beta}{R} - \frac{2\pi}{N}\right) - \sin\phi_{st}\cos(\phi_{st} - \theta).$$

$F_{ymax}$ is an increasing function if $\chi_1 \geq 0$, and a decreasing function if $$\frac{a_p\tan\beta}{R} \leq \frac{2\pi}{N},$$

that is to say, it increases at first and then decreases, so minimum value of $F_{ymax}$ can be obtained when $$\frac{a_p\tan\beta}{R} = \frac{2\pi}{N},$$

namely $$\beta = \arctan\frac{2\pi R/N}{a_p}.$$

What should be considered is whether $\chi_1 \geq 0$ is correct when $$\frac{a_p\tan\beta}{R} \geq \frac{2\pi}{N}.$$

$$0 \leq \frac{a_p\tan\beta}{R} - \frac{2\pi}{N} \leq \varepsilon$$

is taken into consideration, ε is a selected figure which is relatively small.

$$\cos\left(\frac{a_p\tan\beta}{R} - \frac{2\pi}{N}\right) \approx 1,\ \sin\left(\frac{a_p\tan\beta}{R} - \frac{2\pi}{N}\right) \approx 0$$

It can be obtained according to formula 25 that $$\chi_1 \approx \frac{2\pi}{N} - \sin\phi_{st}\cos(\phi_{st} - \theta),$$

and $\chi_1 \geq 0$ when $$\frac{2\pi}{N} \geq \sin\phi_{st}\cos(\phi_{st} - \theta).$$

As a result, it can meet the condition if $$N \leq \text{int}\left(\frac{2\pi}{\sin\phi_{st}\cos(\phi_{st} - \theta)}\right),$$

wherein int (*) represents rounding off positive number. For example, $$N \leq \operatorname{int}\left(\frac{2\pi}{1}\right) = 6$$

if $\sin \phi_{st} \cos (\phi_{st}-\theta) \leq 1$, namely $\chi_1 \geq 0$ if N<7. Actually, the tool with less than 7 blades is the most commonly used processing tool. The critical spiral angle can be obtained through formula 26.

$$\beta = \arctan \frac{2\pi R/N}{a_p} \tag{26}$$

Figure 15:
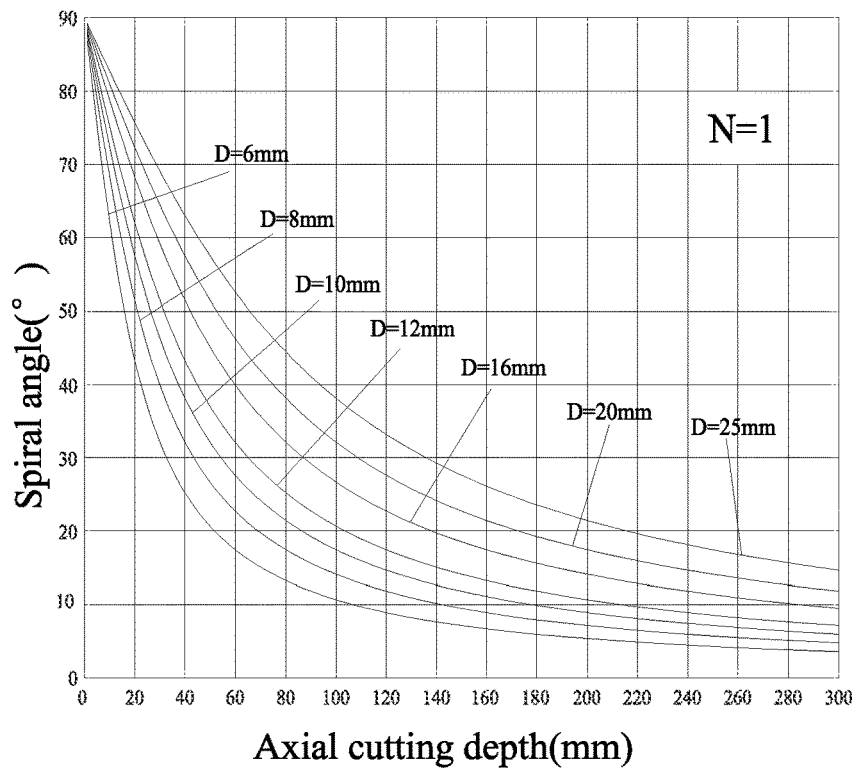
FIG. 15 is a diagram showing the choosing of the spiral angle of the single spiral blade.
Figure 16:
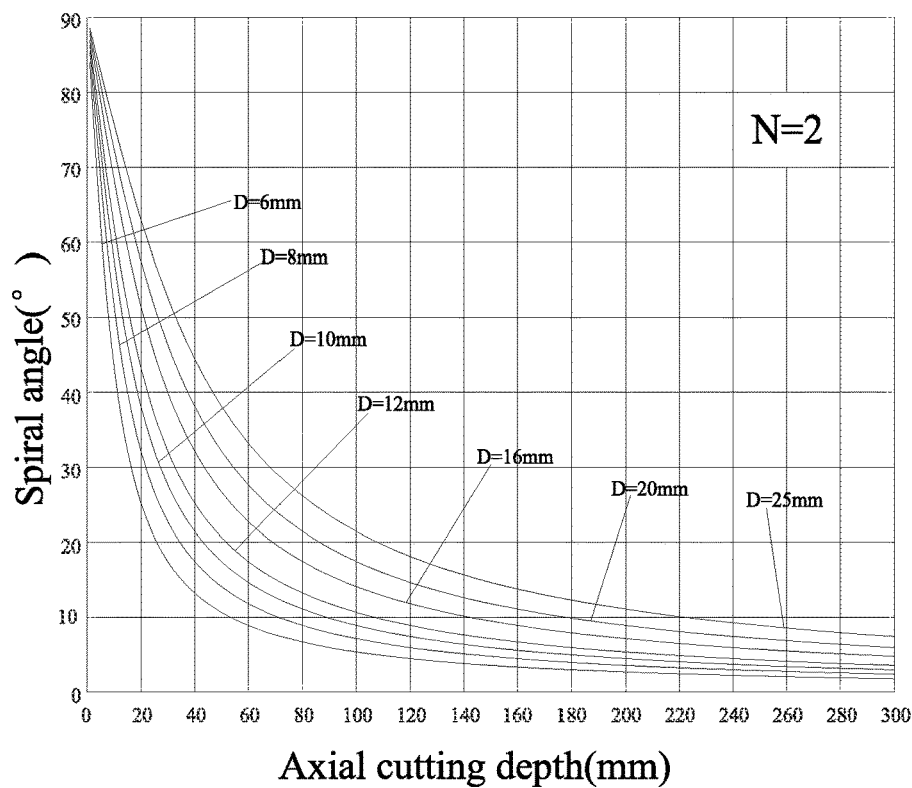
FIG. 16 is a diagram showing the choosing of the spiral angles of two spiral blades.
Figure 17:
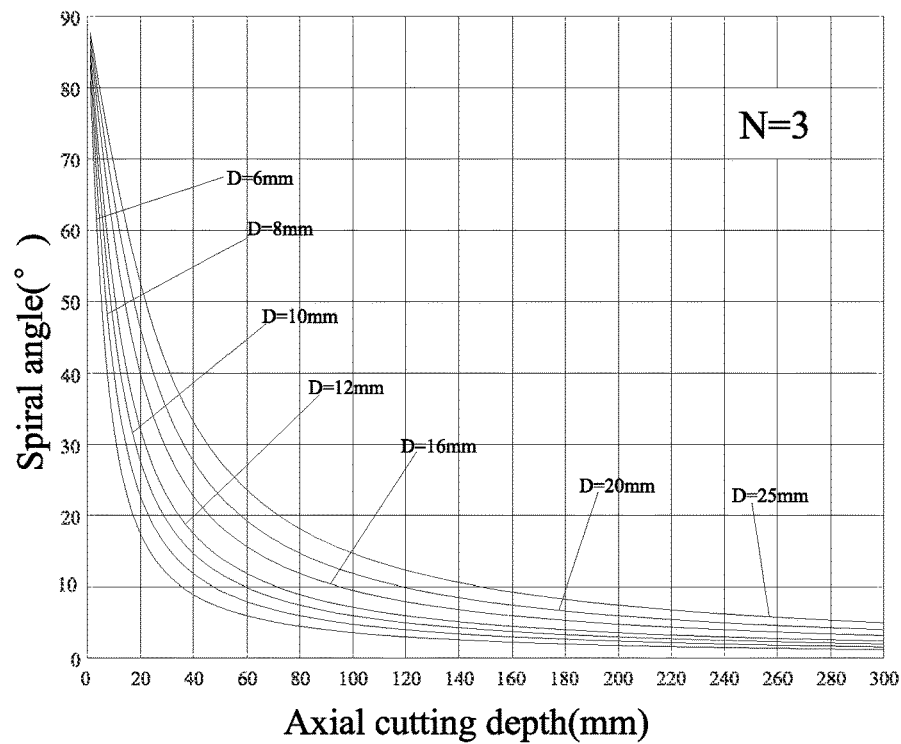
FIG. 17 is a diagram showing the choosing of the spiral angles of three spiral blades.
Figure 18:
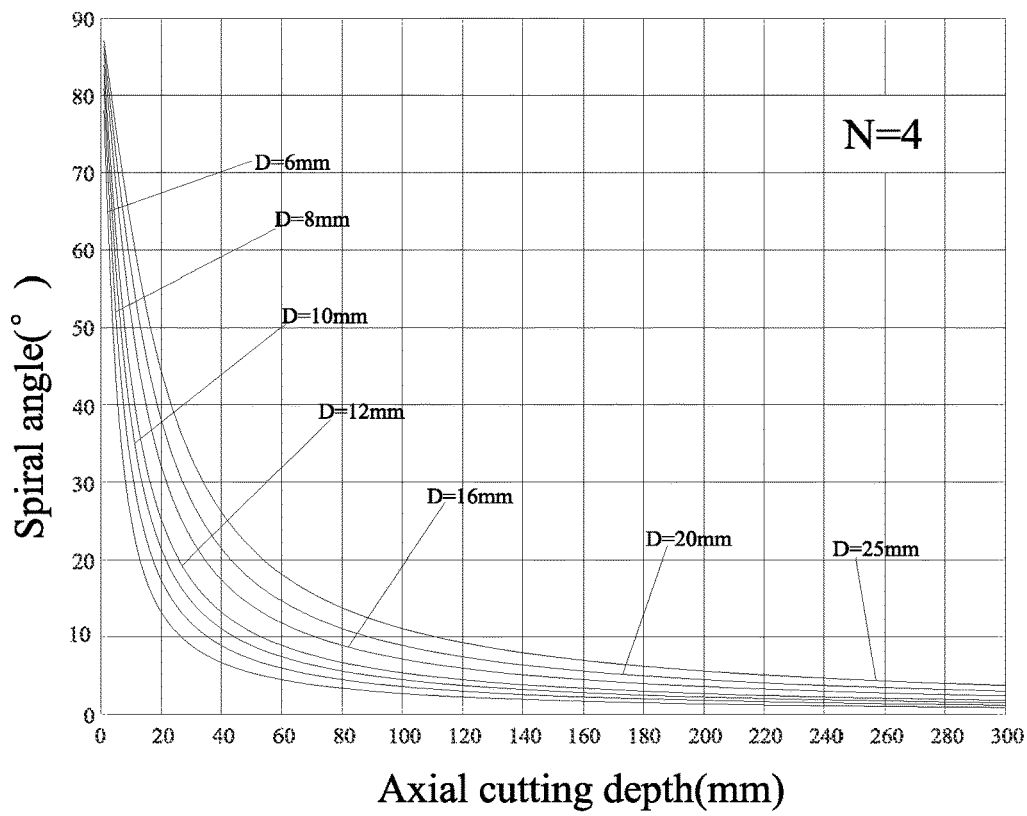
FIG. 18 is a diagram showing the choosing of the spiral angles of four spiral blades.

FIG. 15 is a diagram showing the choosing of the spiral angle of the single spiral blade. FIG. 16 is a diagram showing the choosing of the spiral angles of two spiral blades. FIG. 17 is a diagram showing the choosing of the spiral angles of three spiral blades. FIG. 18 is a diagram showing the choosing of the spiral angles of four spiral blades.

Referring to FIG. 15-18, curves in FIG. 15-18 can be obtained according to the quotation 26, equal-spiral-angle tool with minimum milling force can be chosen according to the diameter and axial cutting depth of the tool when choosing single or multiple spiral blades, which can reduce the milling force, the abrasion and the cutting heat, thus improving the cutting efficiency and quality.

Figure 19:
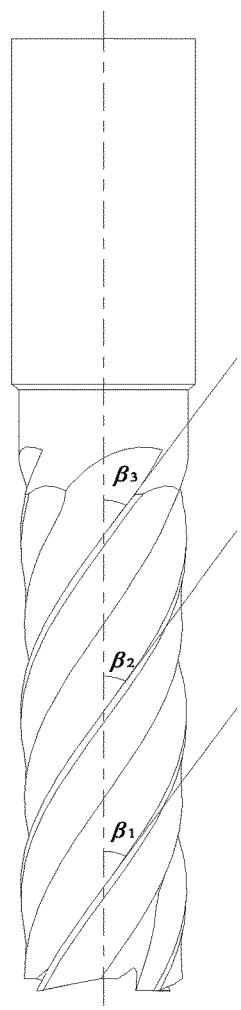
FIG. 19 is an illustrative diagram of the unequal spiral angle tool.
Figure 20:
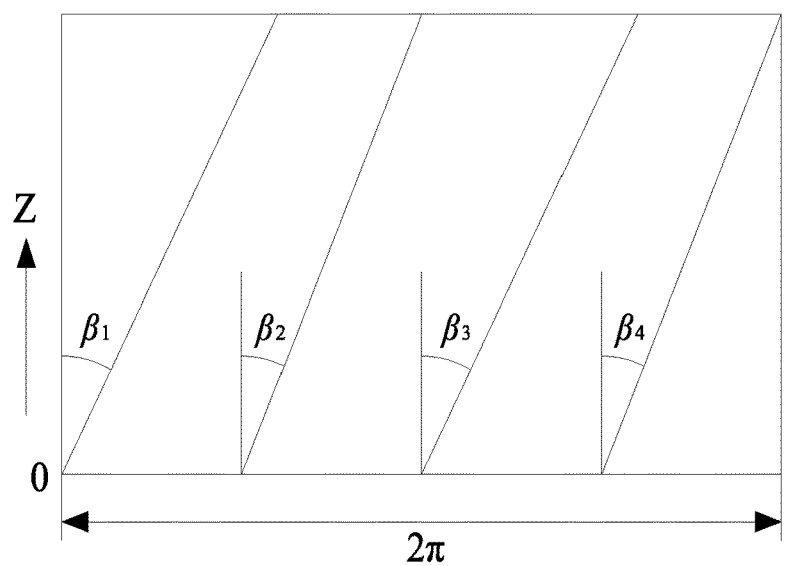
FIG. 20 is a diagram showing the unfolded spiral blades of the unequal spiral angle tool.

FIG. 19 is an illustrative diagram of the unequal spiral angle tool. FIG. 20 is a diagram showing the unfolded spiral blades of the unequal spiral angle tool.

Figure 21:
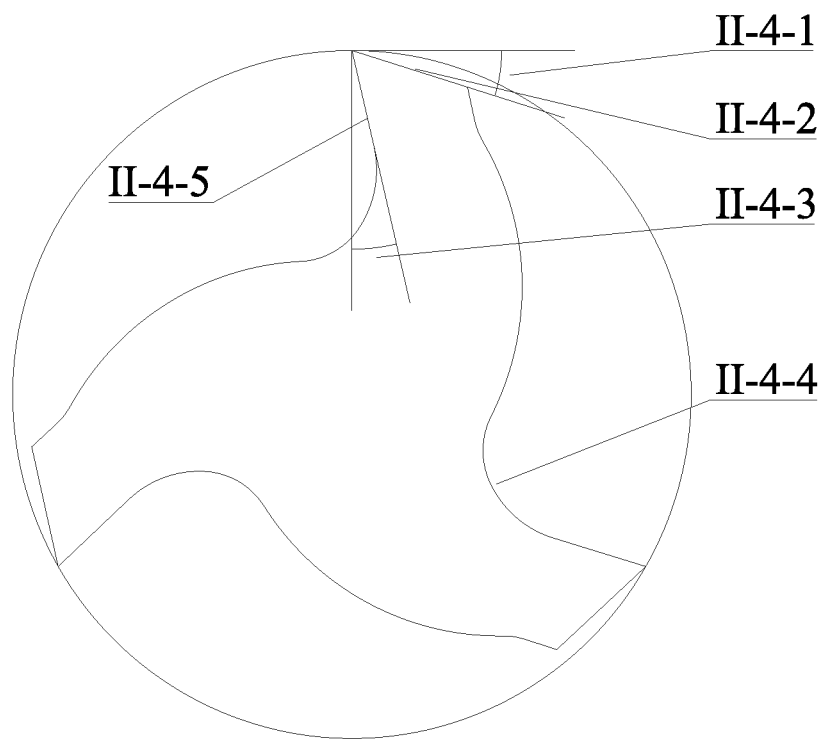
FIG. 21 is an illustrative diagram of the plane cutting angle.

Referring to FIG. 20-21, the design of unequal spiral angle tool is illustrated. The unequal spiral angle tool includes a handle component, a neck component and a blade component, the handle component is mounted on the spindle IV-8, a machine tool is used to fix the holder component of the tool. The blade component is connected with the handle component through the neck component. The blade component used to cut is provided with multiple spiral blades, and the spiral angles of the blades are different from each other. If there are two blades, $\beta_1 \neq \beta_2$. If there are three blades, $\beta_1 \neq \beta_2 \neq \beta_3$. If there are four blades, $\beta_1 \neq \beta_2 \neq \beta_3 \neq \beta_4$. In the present embodiment, it is regarded that $\beta_1 = \beta_3 = \beta$, $\beta_2 = \beta_4 = \beta + n$, n represents the difference of the spiral angles. Considering the design of spiral angles of unequal spiral angle tool, the milling force in Y-axis direction can be represented as follows:

$$F_y = -\frac{K_t f_t R}{2\tan\beta}\left(\phi(z) - \frac{\sin 2\phi(z)}{2} + \frac{K_r}{K_t}\frac{\cos 2\phi(z)}{2}\right)_{\phi}^{\phi_{st}} - \frac{K_t f_t R}{2\tan(\beta+n)}\left(\phi(z) - \frac{\sin 2\phi(z)}{2} + \frac{K_r}{K_t}\frac{\cos 2\phi(z)}{2}\right)_{\phi_{ex}}^{\phi+(2\pi/N)-\frac{a_p \tan(\beta+n)}{R}} \tag{27}$$

What can be obtained after further calculation is as follows:

$$F_y = \frac{K_t f_t R}{2\tan\beta}\left(-\phi_{st} + \frac{\sin 2\phi_{st}}{2} - \frac{K_r}{K_t}\frac{\cos 2\phi_{st}}{2} + \phi\right) - \frac{K_t f_t R}{2\tan(\beta+n)}\left(\phi_{ex} - \frac{\sin 2\phi_{ex}}{2} + \frac{K_r}{K_t}\frac{\cos 2\phi_{ex}}{2} + \phi + \frac{2\pi}{N} - \frac{a_p \tan\beta}{R}\right)$$

$$-\frac{K_t f_t R}{4\tan\beta}\sqrt{\left(\frac{K_r}{K_t}\right)^2 + 1}\sin(2\phi+\theta) + \frac{K_t f_t R}{4\tan(\beta+n)}\sqrt{\left(\frac{K_r}{K_t}\right)^2 + 1}\sin\left(2\phi + \frac{4\pi}{N} - \frac{2a_p\tan(\beta+n)}{R} + \theta\right)$$

$$= \frac{K_t f_t R}{2\tan\beta}\left(-\phi_{st} + \frac{\sin 2\phi_{st}}{2} - \frac{K_r}{K_t}\frac{\cos 2\phi_{st}}{2} + \phi\right) - \frac{K_r f_t R}{4\tan\beta}\sqrt{\left(\frac{K_r}{K_t}\right)^2 + 1}\sin(2\phi+\theta)$$

$$-\frac{K_t f_t R}{2\tan(\beta+n)}\left[\phi_{ex} - \frac{\sin 2\phi_{ex}}{2} + \frac{K_r}{K_t}\frac{\cos 2\phi_{ex}}{2} + \phi + \frac{2\pi}{N} - \frac{a_p\tan(\beta+n)}{R} - \frac{1}{2}\sqrt{\left(\frac{K_r}{K_t}\right)^2 + 1}\sin\left(2\phi + \frac{4\pi}{N} + \theta - \frac{2a_p\tan(\beta+n)}{R}\right)\right] \tag{28}$$

The milling force of the unequal spiral angle tool when milling workpiece can be simulated according to the formula. And formula 29 can be obtained through derivation:

$$\frac{dF_y}{dn} \frac{A}{\sin^2(\beta+n)}\left[B - C\sin\left(D - \frac{2a_p\tan(\beta+n)}{R}\right) - \frac{a_p\tan(\beta+n)}{R}\right]$$

$$-\frac{A}{\tan(\beta+n)}\left[-\frac{a_p}{R\cos^2(\beta+n)} + \frac{2Ca_p}{R\sin^2(\beta+n)}\cos\left(D - \frac{2a_p\tan(\beta+n)}{R}\right)\right]$$

$$= \frac{AB}{\sin^2(\beta+n)} - \frac{AC}{\sin^2(\beta+n)}\sin\left(D - \frac{2a_p\tan(\beta+n)}{R}\right) - \frac{AC}{\sin^2(\beta+n)}\frac{2a_p}{R\tan(\beta+n)}\cos\left(D - \frac{2a_p\tan(\beta+n)}{R}\right) \tag{29}$$

Wherein, $$A = \frac{K_t f_t R}{2},$$

$$B = \phi_{ex} - \frac{\sin 2\phi_{ex}}{2} + \frac{K_r}{K_t}\frac{\cos 2\phi_{ex}}{2} + \phi + \frac{2\pi}{N} - \frac{a_p\tan\beta}{R},$$

$$C = \frac{1}{2}\sqrt{\left(\frac{K_r}{K_t}\right)^2 + 1},$$

$$D = 2\phi + \frac{4\pi}{N} + \theta.$$

When $$D \geq \frac{2a_p\tan(\beta+n)}{R}:$$

$$\frac{dF_y}{dn} \geq \frac{AB}{\sin^2(\beta+n)} - \frac{AC}{\sin^2(\beta+n)}\cos\left(D - \frac{2a_p\tan(\beta+n)}{R}\right)$$
$$\frac{AC}{\sin^2(\beta+n)}\frac{2a_p}{R\tan(\beta+n)}\cos\left(D - \frac{2a_p\tan(\beta+n)}{R}\right)\infty B -$$
$$C\cos\left(D - \frac{2a_p\tan(\beta+n)}{R}\right) - \frac{2a_pC}{R\tan(\beta+n)}\cos\left(D - \frac{2a_p\tan(\beta+n)}{R}\right) \geq \chi_2$$

Wherein, $$\chi_2 = B - C\sin\left(D - \frac{2a_p\tan(\beta+n)}{R}\right) - \frac{2a_pC}{R\tan(\beta+n)}\cos\left(D - \frac{2a_p\tan(\beta+n)}{R}\right).$$

$F_y$ is an increasing function if $\chi_2 \geq 0$, and is a decreasing function if $$D \leq \frac{2a_p\tan(\beta+n)}{R},$$

it decreases at first and then increases, so the minimum value of Fy can be achieved when, $$D = \frac{2a_p\tan(\beta+n)}{R},$$

namely $$2\phi + \frac{4\pi}{N} + \theta = \frac{2a_p\tan(\beta+n)}{R}.$$

It can be seen that the angle difference is related to the cutting depth, the radius, the spiral angle and the amount of blades, so a minimum milling force can be ensured by choosing optimal angle difference of the unequal spiral angle tool according to different conditions.

What should be considered is whether $\chi_2 \geq 0$ is correct when $$D \geq \frac{2a_p\tan(\beta+n)}{R}.$$
$$0 \leq D - \frac{2a_p\tan(\beta+n)}{R} \leq \varepsilon$$

is taken into consideration, ε is a selected figure which is relatively small.

As a result, $$\cos\left(D - \frac{2a_p\tan(\beta+n)}{R}\right) \approx 1,$$
$$\sin\left(D - \frac{2a_p\tan(\beta+n)}{R}\right) \approx 0.$$

It can be obtained that $$\chi_2 = B - \frac{2a_pC}{R\tan(\beta+n)},$$

and $\chi_2 \geq 0$
when $$B \geq \frac{2a_pC}{R\tan(\beta+n)}.$$

Since $$B \geq \frac{2\pi}{N} \geq \frac{2a_p}{R\tan(\beta+n)} \geq \frac{2a_pC}{R\tan(\beta+n)},$$

it is enough that $$\frac{2\pi}{N} \geq \frac{2a_p}{R\tan(\beta+n)}.$$

As a result, it can meet the condition if $$N \leq \text{int}\left(\frac{R\tan(\beta+n)\pi}{a_p}\right),$$

wherein int (*) represents rounding off positive number. For example, N≤31 if R=16 mm, β+n=38°, $a_p$=0.5 mm. Namely, if N<32, $\chi_2 \geq 0$, which can be achieved easily. Therefore, the angle difference can be obtained through formula, $$2\phi + \frac{4\pi}{N} + \theta = \frac{2a_p\tan(\beta+n)}{R}.$$

Figure 22:
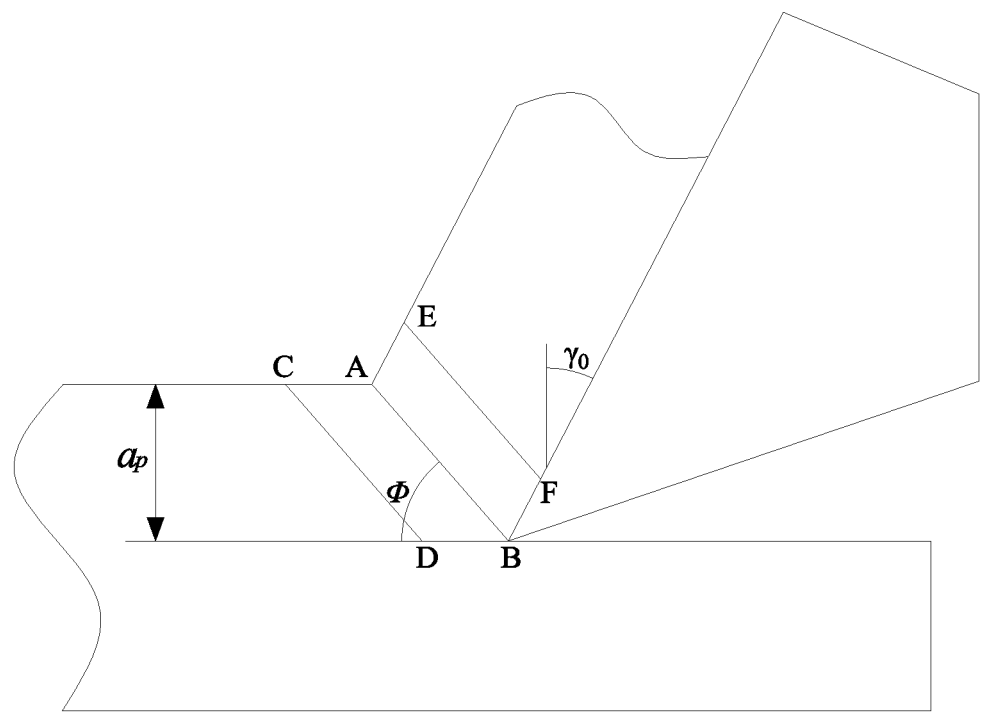
FIG. 22 is an illustrative diagram of the cutting area.
Figure 23:
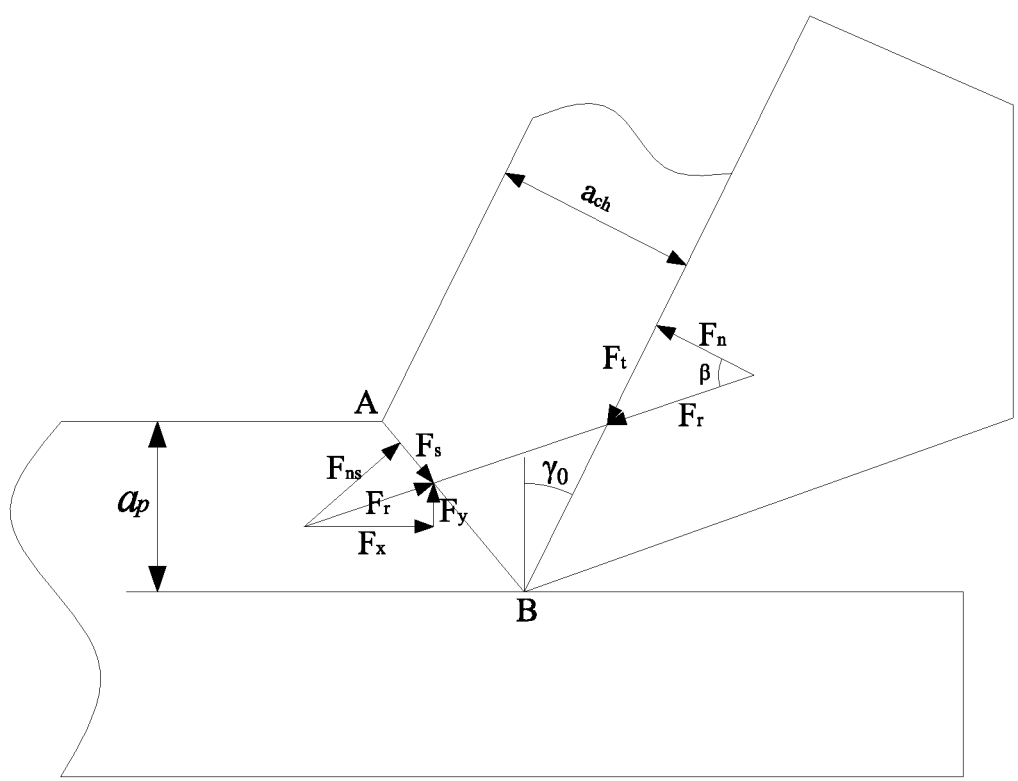
FIG. 23 is a force analysis diagram in cutting area.
Figure 24:
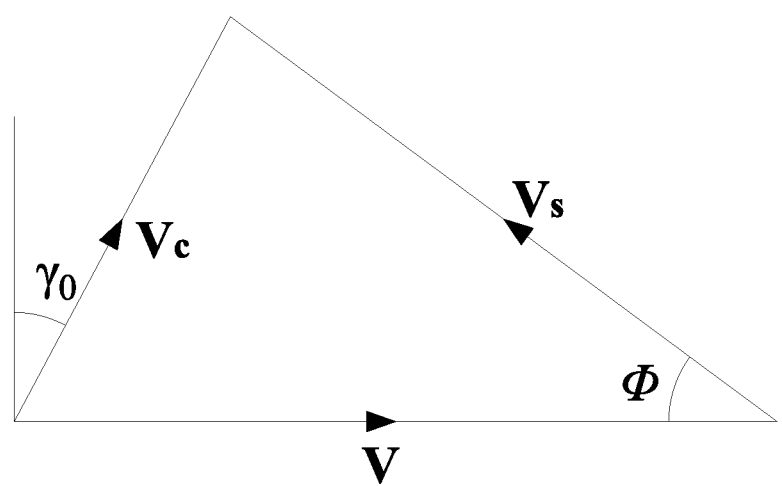
FIG. 24 is a velocity diagram.

FIG. 21 is an illustrative diagram of the plane cutting angle. FIG. 22 is an illustrative diagram of the shear area. FIG. 23 is a force analysis diagram in shear area. FIG. 24 is a velocity diagram.

Referring to FIG. 21-24, the design for tool is illustrated. II-4-1 represents the rear angle which is mainly used to reduce the friction between the back cutting surface and the transition surface. Due to the elastic and plastic deformation in the process of chip formation and the effect of the blunt circle radius of the blade, there is an elastic recovery layer on the transition surface. An appropriate rear angle can improve the quality of the processed surface and the service life of the tool. II-4-2 represents the back surface of the tool. II-4-3 represents the front angle of the tool, which may influence the deformation degree of the cutting area. And it may also influence the strength, the force nature and the heat dissipation conditions of the blade and tool head, which means that, increasing the front angle of the tool will reduce the strength of the blade and tool head, reduce the thermal conductivity area and heat capacity volume of the tool head, and excessively increasing the front angle may lead to bending stress at the blade, causing blade breakage. And it may also influence the chip shape and chip breaking effect, which means that, reducing the front angle may increase the deformation of the chip and resulted in easy embrittlement and fracture. And it may also influence the quality of the processed surface. II-4-4 represents the chip groove which is used to accommodate the chip. The chip groove will be easily filled when cutting if it is too small. II-4-5 represents the front surface of the tool.

The material of the cutting layer is plastically deformed from the surface CD, that is the initial shear plane of the first deformation zone. The deformation ends on the surface EF, that is the terminal shear plane of the first deformation zone, and the shear strain is the maximum. The shear strains on surface CD, AB and EF are represented as follows:

$$\gamma_{CD} = 0, \gamma_{AB} = \frac{\cos\gamma_0}{2\sin\phi\cos(\phi - \gamma_0)}, \gamma_{EF} = \frac{\cos\gamma_0}{\sin\phi\cos(\phi - \gamma_0)} \quad (30)$$

The shear angle $\phi$ in above formula can be determined by the following formula.

$$\phi = \arctan\frac{\cos\gamma_0}{\xi - \sin\gamma_0} \quad (31)$$

Wherein, $\xi$ represents the material deformation coefficient that is related to material, and $\gamma_0$ represents the front angle of the tool.

The plastic deformation in the shear zone will increase the temperature of the shear surface, and the temperature variation in shear zone $\Delta T_{sz}$ related to the shear force can be calculated by the formula 32.

$$\Delta T_{sz} = \frac{1 - \beta_T}{\rho S a_c a_w} \frac{F_s \cos\gamma_0}{\cos(\phi - \gamma_0)} \quad (32)$$

Wherein, $$\left.\begin{array}{l}\beta_T = 0.5 - 0.35\log(R_T\tan\phi) \quad 0.04 \le R_T\tan\phi \le 10.0 \\ \beta_T = 0.3 - 0.15\log(R_T\tan\phi) \quad R_T\tan\phi > 0.0\end{array}\right\},$$

$R_T$ represents the coefficient of the dimensionless thermal, $$R_T = \frac{\rho S V a_c}{K},$$

$\rho$ represents the density (Kg/m$^3$) of the workpiece material, K represents the thermal conductivity coefficient (m$^{2 \cdot \circ}$ C.) of the workpiece material, S represents the specific heat (g·° C.), V represents the cutting speed.

The average temperature on the shear surface T is as follows:

$$T_{AB} = T_w + \eta\Delta T_{sz} \quad (33)$$

Wherein, $T_w$ represents the environmental temperature (° C.), $\eta$ represents the plastic work transform heat coefficient, the value of $\eta$ is 0.7.

The flow stress towards the line AB is represented as follows:

$$k_{AB} = \frac{1}{\sqrt{3}}\sigma_0\left(1 + \frac{\varepsilon_{ab}}{\varepsilon_0}\right)^n\left(\frac{\dot{\varepsilon}_{ab}}{\dot{\varepsilon}_0}\right)^m\left(1 - \frac{T_{AB}}{T_m}\right)^l \quad (34)$$

Wherein, $\sigma_0$ represents the initial yield stress (1000 MPa), $\varepsilon_0$ represents the initial strain $$\varepsilon_0 = \frac{\sigma_0}{E},$$

n represents the strain index (0.1), $\dot{\varepsilon}$ represents the strain speed, $\dot{\varepsilon}$ represents the yield strain speed, m represents the strain speed index (0.0143), T represents the cutting temperature, $T_m$ represents the melt temperature related to the material, l represents the temperature softening coefficient (0.75).

The shear force on the shear surface is as follows:

$$F_s = k_{AB}l_{AB}a_w = \frac{k_{ab}a_p a_w}{\sin\phi} \quad (35)$$

Wherein, $k_{AB}$ represents the shear stress towards the line AB, $l_{AB}$ represents the length of the shear surface AB, $a_w$ represents the cutting width.

There are three velocities in cutting process, including the cutting speed $v$, the chip speed $v_c$, and the shear speed $v_s$. The cutting speed is the linear speed of the tool. These three velocities are connected end to end and form a closed triangle based on continuity conditions. The chip speed and the shear speed are represented as follows:

$$v_c = \frac{\sin\phi}{\cos(\phi - \gamma_0)}v \quad (36)$$

$$v_s = \frac{\cos\gamma_0}{\cos(\phi - \gamma_0)}v \quad (37)$$

The shear energy is represented as follows:

$$E_s = F_s v_s \quad (38)$$

The angle $\theta$ between the shear surface AB and the shear surface resultant R is called as a cutting angle:

$$\theta = \phi + \beta - \gamma_0 \quad (39)$$

It can be obtained according to mechanics of materials that, $$\phi + \beta - \gamma_0 = \frac{\pi}{4} = \theta.$$

The cutting resultant R in shear zone is represented as follows:

$$R = \frac{F_s}{\cos\theta} = \frac{k_{ab}a_p a_w}{\sin\phi\cos\theta} \quad (40)$$

According to the principle of force balance on shear surface, the relationship between the cutting force ($F_e$) in the direction of the cutting speed, the cutting force ($F_t$) in the direction of the cutting thickness and the cutting resultant can be deduced as follows $$\begin{cases} F_c = R\cos(\beta - \gamma_0) \\ F_t = R\sin(\beta - r_0) \end{cases} \quad (41)$$

The formula 40 can be modified as follows:

$$R = \sqrt{2} k_{ab} a_p a_w \csc \phi \quad (42)$$

According to the curve of y=cscx, y is monotonic decreasing when x∈(0,π/2), monotonic increasing when x∈(π/2, π), and minimum when x=π/2.

According to the theory, the shear angle is less than 44, therefore, when φ=π/4, the cutting resultant is the minimum. According to the formula 31, the optimal front angle of the tool is related to the material deformation coefficient. According to the experiment and production experience, the thickness of chip is generally larger than the thickness of the cutting layer, the length of chip is less than the length of the cutting layer. Since the width of chip and the width of the cutting layer change little, the deformation coefficient is generally larger than 1 according to the law of constant volume. If the deformation coefficient is 1.1, the optimal front angle is 7°, if the deformation coefficient is 1.2, the optimal front angle is 12°.

According to the empirical formula of the milling force, the functional relation between the milling force and the front angle, the rear angle and the spiral angle of the tool is as follows:

$$F = k_1 \left( \frac{k_2 - 1.5\gamma_0}{100} \right)^{k_3} a^{k_4} \beta^k \quad (43)$$

Wherein, a represents the rear angle, $k_1$, $k_2$, $k_3$, $k_4$ respectively represents a constant.

$k_1$, $k_2$, $k_3$, $k_4$ can be defined according to experiments. The empirical model about the relationship between the milling force and the geometry parameters of tool can be obtained from experiments.

$$F = e^{1.369}(e^{5.163} - \gamma)^{1.401} a^{0.227} \beta^{-1.003} \quad (44)$$

The coefficient of the rear angle is larger than 0 and less than 1, the larger the rear angle is, the larger the milling force will be. Therefore a smaller rear angle should be chosen. On the contrary, since the rear angle can reduce the abrasion between the back surface of tool and the manufacturing surface of workpiece, the quality of the workpiece surface will be poor if the rear angle is too small. Therefore, according to the experience, both the small milling force and good surface quality of workpiece can be ensured when the rear angle is 10°-15°.

The above is only the preferred embodiments of the disclosure, but not the limitations to the scope of the disclosure. Modifications and variations can be made to the disclosure by the skilled in the art. Any modifications, equivalents, and improvements made within the spirit and principle of the disclosure will fall into the scope of the disclosure.

The detailed embodiments have been described above according to the drawings, which are not the limitations to the scope of the disclosure. Any modifications and variations made by the skilled in the art without creative efforts based on the technical scheme of the present disclosure should fall into the scope of the present disclosure.

We claim:

1. A method for operating a milling system that comprises a lubrication system, a tool storage, a tool change system, a cutting system, and a force measuring system, wherein:

the lubrication system provides lubricating oil to the cutting system, the lubrication system having a power source in the form of high-pressure gas, an input frequency and a volume of the high-pressure gas can be controlled through a frequency generator and a gas volume control knob, a quantity of the lubricating oil in a lubrication pump can be adjusted accordingly, then the lubricating oil can be provided to the cutting system through a nozzle interface in connection with an outlet interface of the lubrication pump;

the tool storage comprises a storage magazine on which a plurality of cutter assemblies are circumferentially distributed, each cutter assembly of the plurality of cutter assemblies comprising a respective mandrel and a respective cutter which is connected at a first end of the associated mandrel, and helical angles of the cutters of multiple ones of the plurality of cutter assemblies are not identical, the cutter which is matched with an operating condition can be faced to the tool change system through the rotation of the storage magazine;

the tool change system comprises two mechanical arms facing opposite directions, and a rotating shaft is provided at the middle of the two mechanical arms, the positions of the two mechanical arms can be switched by controlling the rotation of the rotating shaft, and thus the cutter assembly change between the cutting system and the tool storage is realized through switching of the positions of the two mechanism arms;

the cutting system comprises a spindle having arranged thereon a given cutter assembly of the plurality of cutter assemblies, and rotation of the given cuter assembly arranged on the spindle is driven by controlling rotation of the associated mandrel to which the cutter arranged on the associated mandrel is connected, wherein cutting is achieved through rotation of the cutter;

the force measuring system is arranged at a first end of the cutting system, and is used to measure a cutting force received by a workpiece fixed thereon, so a cutter with non-identical helical angles can be chosen for milling according to the machining parameters; and the lubrication system further comprises an inlet interface, a gas source processor, the lubrication pump, a nozzle and connection pipelines, and controlling valves arranged at various ones of the connection pipelines, the inlet interface is fixed on the gas source processor, the high-pressure gas entering through the inlet interface is filtered by the gas source processor and then provided to the lubrication system, an electromagnetic valve is fixed on the gas source processor through a two-way joint to control the entrance of the high-pressure gas, a three-way valve is connected with an outlet of the electromagnetic valve, the high-pressure gas enters the frequency generator through an outlet pipeline of the three-way valve, and the input frequency of the high-pressure gas can be controlled by the frequency generator, the high-pressure gas coming out of the frequency generator enters the lubrication pump through the connection pipelines, then the lubricating oil can be provided to the cutting system through the nozzle interface in connection with the outlet interface of lubrication pump, wherein the method for operating the milling system comprises choosing, among the plurality of cutter assemblies, a specific cutter assembly of which the non-identical helical angles of the cutter exhibit an angle difference that suits to a specific condition of multiple different conditions including dry cutting, casting-type lubrication, minimal quantities of lubrication or minimal quantities of nanofluid lubrication, and/or choosing, among the plurality of cutter assemblies, a specific cutter assembly of which the cutter is optimal for a specific cutting parameter of multiple different cutting parameters, in order to obtain a minimum cutting force applied to a workpiece by the cutter of the specific cutter assembly chosen among the plurality of cutter assemblies.

2. The method for operating the milling system according to claim 1, wherein the high-pressure gas enters the lubrication pump through another outlet pipeline of the three-way valve, an oil cup is connected through threaded connection at one end and connected to a fixing cover of the lubrication pump through threaded connection at the other end, the fixing cover of the lubrication pump fixed on a box body is connected with the lubrication pump, the volume of the high-pressure gas can be adjusted through the gas volume control knob, and the quantity of the lubricating oil can be adjusted through an oil quantity control knob.

3. The method for operating the milling system according to claim 1, wherein the tool change system comprises a motor, the rotating shaft and at least the two mechanical arms, the motor drives the rotating shaft to rotate, the two mechanical arms are located at the outer circumference of the rotating shaft and facing opposite directions, one is facing at the tool storage, and the other is facing at the cutting system, the positions of the two mechanical arms can be switched by controlling the rotation of the rotating shaft.

4. The method for operating the milling system according to claim 1, wherein the force measuring system comprises a workbench, a workpiece holder and a measuring element, the workbench is placed right under the cutting system, the workpiece holder is fixed on the workbench, the workpiece with a degree of freedom can be completely fixed by the workpiece holder and the workbench, the measuring element can collect the cutting force received by the workpiece, the measured signal is amplified by an amplifier and then delivered to a force information collection device, in the end, the magnitude of the cutting force can be displayed on a computer.

5. The method for operating the milling system according to claim 4, wherein the workpiece holder comprises an X-axis direction clamping element, a Y-axis direction clamping element, and a Z-axis direction clamping element, wherein the X-axis direction clamping element includes a plurality of positioning screws, the Y-axis direction clamping element includes fastening screws and a positioning block, one face of the positioning block contacts with a side face of the workpiece, another face of the positioning block contacts with the fastening screws, and the positioning block can be tightened when the plurality of fastening screws are tightened; the Z-axis direction clamping element includes a plurality of clamping plates, each of which is a self-adjusting clamping plate, and in order to meet a requirement for change in size of the workpiece, the workpiece holder can be adjusted according to the size of the workpiece through adjustment of the X-axis direction, the Y-axis direction, and the Z-axis direction clamping elements.

6. The method for operating the milling system according to claim 1, wherein the cutter of at least one of the plurality of cutter assemblies has helical angles that are identical, the method further comprising: choosing, among the plurality of cutter assemblies, a specific cutter assembly of which the cutter has identical helical angles such that a diameter and an axial cutting depth of the cutter exhibit a minimum cutting force applied to a workpiece.

* * * * *